United States Patent
Kobayashi et al.

(10) Patent No.: US 7,099,145 B2
(45) Date of Patent: Aug. 29, 2006

(54) SOLID ELECTROLYTIC CAPACITOR AND METHOD FOR MANUFACTURING SOLID ELECTROLYTIC CAPACITOR

(75) Inventors: Masaaki Kobayashi, Tokyo (JP); Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/518,673

(22) PCT Filed: Jun. 18, 2003

(86) PCT No.: PCT/JP03/07735

§ 371 (c)(1),
(2), (4) Date: Sep. 22, 2005

(87) PCT Pub. No.: WO03/107366

PCT Pub. Date: Dec. 24, 2003

(65) Prior Publication Data

US 2006/0120023 A1     Jun. 8, 2006

(30) Foreign Application Priority Data

Jun. 18, 2002  (JP)  .............................. 2002-177544
Jun. 18, 2002  (JP)  .............................. 2002-177545

(51) Int. Cl.
*H01G 9/00*        (2006.01)

(52) U.S. Cl. ..................... 361/523; 361/525; 361/528; 361/529; 361/532; 361/534; 29/25.03

(58) Field of Classification Search ................ 361/523, 361/525–526, 508–509, 527–532, 534; 29/25.03
See application file for complete search history.

(56) References Cited

U.S. PATENT DOCUMENTS

| | | | |
|---|---|---|---|
| 4,831,494 A | | 5/1989 | Arnold et al. ............... 361/306 |
| 4,959,754 A | * | 9/1990 | Stufler et al. ............... 361/527 |
| 5,369,545 A | | 11/1994 | Bhattacharyya et al. . 361/306.2 |
| 5,880,925 A | | 3/1999 | DuPré et al. ................ 361/303 |
| 6,206,937 B1 | * | 3/2001 | Kudoh et al. ............... 29/25.03 |
| 6,464,739 B1 | * | 10/2002 | Yoshida et al. ............. 29/25.03 |
| 6,674,635 B1 | * | 1/2004 | Fife et al. .................... 361/523 |
| 6,807,049 B1 | * | 10/2004 | Konuma et al. ............. 361/524 |

FOREIGN PATENT DOCUMENTS

| | | |
|---|---|---|
| JP | 63-40313 | 2/1988 |
| JP | 63-55448 | 3/1988 |
| JP | 6-31715 | 8/1994 |
| JP | 7-27144 | 11/2001 |
| JP | 2001-307955 | 11/2001 |
| JP | 2002-313676 | 10/2002 |

* cited by examiner

*Primary Examiner*—Nguyen T. Ha
(74) *Attorney, Agent, or Firm*—Seed IP Law Group PLLC

(57) ABSTRACT

It is an object of the present invention to provide a solid electrolytic capacitor which can reduce the ESL and the ESR and increase electrostatic capacitance at a small size, and a method for manufacturing such a solid electrolytic capacitor. A solid electrolytic capacitor component includes a foil-like aluminum substrate whose surface is roughened or enlarged and which is formed with an aluminum oxide film 2x on the surface thereof and foil-like aluminum substrates whose surfaces are not roughened and a cathode electrode including a solid high molecular polymer electrolyte layer, a graphite paste layer and a silver paste layer is formed on the surface of the foil-like aluminum substrate. In the solid electrolytic capacitor component 110, lead electrode pairs including anode lead electrodes are disposed adjacent with each other, whereby magnetic fields to be generated are canceled.

7 Claims, 28 Drawing Sheets

SOLID ELECTROLYTIC CAPACITOR AND METHOD FOR MANUFACTURING SOLID ELECTROLYTIC CAPACITOR

BACKGROUND OF THE INVENTION

1. Field of the Invention

The present invention relates to a solid electrolytic capacitor and a method for manufacturing a solid electrolytic capacitor and, particularly, to a solid electrolytic capacitor which is constituted by forming at least a solid high molecular polymer electrolyte layer and a conductive layer on a foil-like valve metal substrate formed with an insulating oxide film on the surface thereof and can reduce the ESL and the ESR and increase electrostatic capacitance at a small size, and a method for manufacturing such a solid electrolytic capacitor.

2. Description of the Related Art

An electrolytic capacitor is conventionally formed by employing a so-called valve metal capable of forming an insulating oxide film such as aluminum, titanium, brass, nickel, tantalum or the like as an anode, anodizing the surface of the valve metal to form an insulating oxide film thereon, forming an electrolyte layer substantially serving as a cathode, and forming a conductive layer of graphite, silver or the like as a cathode.

For example, an aluminum electrolytic capacitor is formed by employing as an anode a porous aluminum foil whose specific surface area is increased by etching, and providing a separation paper impregnated with an electrolytic solution between an aluminum oxide layer formed on the surface of the anode and a cathode foil.

In general, although an electrolytic capacitor using an electrolytic solution for an electrolyte layer between an insulating oxide film and a cathode has the disadvantage that its lifetime is determined by liquid leakage, evaporation of the electrolytic solution and the like, a solid electrolytic capacitor using a solid electrolyte containing metal oxide or organic compounds does not have such a disadvantage and is preferable.

Manganese dioxide is a typical metal oxide usable for the solid electrolyte of a solid electrolytic capacitor. On the other hand, as an organic compound usable for the solid electrolyte of a solid electrolytic capacitor, 7,7,8,8-tetracyanoquinodimethane (TCNQ) complex salt disclosed in Japanese Patent Application Laid Open No. 52-79255 and Japanese Patent Application Laid Open No. 58-191414 can be cited.

Recently, as the frequency of power circuits of electronic devices has become higher, corresponding performance is required of capacitors used therewith. However, a solid electrolytic capacitor using a solid electrolyte layer containing manganese dioxide or TCNQ complex salt has the following disadvantages.

Although a solid electrolyte layer containing manganese dioxide is generally formed by repeating thermal decomposition of manganese nitrate, an insulating oxide film is damaged or degraded by heat applied during thermal decomposition or oxidative effect of NOx gas generated during thermal decomposition. Therefore, in the case where a solid electrolyte layer is formed using manganese dioxide, leakage current becomes high, for example, and various characteristics of the capacitor finally obtained tend to be lowered. Further, in the case where a solid electrolyte layer is formed using manganese dioxide, the solid electrolytic capacitor has the disadvantage that impedance thereof becomes higher in the high frequency region.

On the other hand, a solid electrolytic capacitor using TCNQ complex salt does not adequately satisfy the requirement for low impedance of current solid electrolytic capacitors, since the electric conductivity of TCNQ complex salt is about 1 S/cm or lower. It has been further pointed out that the reliability of a solid electrolytic capacitor using TCNQ complex salt as a solid electrolyte is not sufficient for the reason that adhesive strength between TCNQ complex salt and an insulating oxide film is low and the thermal stability of TCNQ complex salt during soldering and with lapse of time is low, and the like. In addition, TCNQ complex salt is expensive and, therefore, the cost of a solid electrolytic capacitor using TCNQ complex salt as a solid electrolyte is high.

For solving these problems occurring when manganese dioxide or TCNQ complex salt is used as a solid electrolyte and obtaining a solid electrolytic capacitor having better characteristics, it has been proposed to use as a solid electrolyte a high molecular compound having high electric conductivity whose manufacturing cost is relatively low, whose adhesive strength to an insulating oxide film is relatively good and whose thermal stability is excellent.

For example, Japanese Patent No. 2,725,553 discloses a solid electrolytic capacitor in which polyaniline formed on an insulating oxide film on the surface of an anode by the chemical oxidation polymerization process.

Further, Japanese Patent Publication No. 8-31400 proposes a solid electrolytic capacitor in which a thin film of metal or manganese dioxide is formed on an insulating oxide film and a conductive polymer film of polypyrrole, polythiophene, polyaniline, polyfuran or the like is formed on the thin film of metal or manganese dioxide by the electrolysis polymerization process, for the reason that it is difficult to form a conductive polymer film having high strength on an insulating oxide film on the surface of an anode only by the chemical oxidation polymerization process and that it is impossible or extremely difficult to directly form an electrolysis polymerization film on an insulating oxide film on the surface of an anode by the electrolysis polymerization process because the insulating oxide film on the surface of an anode is a non-conductor.

Furthermore, Japanese Patent Publication No. 4-74853 proposes a solid electrolytic capacitor in which a conductive polymer film of polypyrrole, polythiophene, polyaniline, polyfuran or the like is formed on an insulating oxide film by the chemical oxidation polymerization process.

Further, in order to reduce impedance, it is necessary to lower the equivalent series inductance (ESL) and equivalent series resistance (ESR) of capacitors used in the electronic devices and it is particularly necessary to sufficiently lower the ESL in the electronic devices including the power circuits of low frequency. As methods for decreasing the ESL, there are generally known a first method of shortening the length of the electric path as possible, a second method of canceling the magnetic field generated by one electric path by the magnetic field generated by another electric path, and a third method of dividing an electric path into n pieces to decrease the effective ESL to 1/n. For example, the first method and the third method are employed in the invention taught by Japanese Patent Application Laid Open No. 2000-311832, the second method and the third method are employed in the invention taught by Japanese Patent Application Laid Open No. 06-267802 and the third method is employed in the inventions taught by Japanese Patent Application Laid Open No. 06-267801 and Japanese Patent Application Laid Open No. 11-288846.

At the same time, the frequency of the power circuits of electronic devices has recently become higher and this has made it necessary to lower the equivalent series inductance (ESL) and equivalent series resistance (ESR) of capacitors used in the electronic devices. Even if the initial characteristic ESL value or the like can be markedly improved, such requirement cannot be practically satisfied in the case where the characteristic value is liable to vary in a reliability test such as a high temperature application test or the like. Therefore, it is required to develop an electrolytic capacitor in which initial characteristic ESL and ESR values are very low and do not vary substantially.

BRIEF SUMMARY OF THE INVENTION

It is therefore an object of the present invention to provide a solid electrolytic capacitor which is constituted by forming at least a solid high molecular polymer electrolyte layer and a conductive layer on a foil-like valve metal substrate formed with an insulating oxide film on the surface thereof and can reduce the ESL and the ESR and increase electrostatic capacitance at a small size, and a method for manufacturing such a solid electrolytic capacitor.

The above object of the present invention can be accomplished by a solid electrolytic capacitor comprising at least one solid electrolytic capacitor component comprising a foil-like valve metal substrate formed with an insulating oxide film on the surface thereof, at least one lead electrode pair including an anode lead electrode and a cathode lead electrode which are provided on at least one end portion region of the foil-like valve metal substrate, and a cathode electrode formed by sequentially forming at least a solid high molecular polymer electrolyte layer and a conductive layer on the foil-like valve metal substrate, the anode lead electrode comprising a valve metal body whose one end portion region is bonded to the at least one end portion region of the foil-like valve metal substrate so that electrical connection can be established between the valve metals and a first conductive metal substrate whose one end portion region is bonded to the other end portion region of the foil-like valve metal substrate so that electrical connection can be established between the metals, the cathode lead electrode being formed by drawing out a part of a second conductive metal substrate connected to one surface of the conductive layer formed on the foil-like valve metal substrate in a direction parallel to the anode lead electrode.

According to the present invention, in the case where the parallel anode lead electrode and cathode lead electrode of the one lead electrode pair are disposed adjacent to each other, magnetic fields generated by electrical current paths thereof can be canceled, thereby reducing the ESL. Further, in the case of constituting a multi-terminal type solid electrolytic capacitor in accordance with the present invention, since the electrical current path is divided, it is possible to markedly reduce the ESL.

In a preferred aspect of the present invention, at least one lead electrode pair is provided at each of opposite end portion regions of the foil-like valve metal substrate.

According to this preferred aspect of the present invention, since a wiring pattern can be drawn out from each of the opposite end portion regions of the foil-like valve metal substrate and the electrical current path of the solid electrolyte capacitor can be divided, it is possible to deal with a large amount of ripple current.

In a preferred aspect of the present invention, at least one lead electrode pair is provided at each of four end portion regions of the foil-like valve metal substrate.

According to this preferred aspect of the present invention, since a wiring pattern can be drawn out from each of four end portion regions of the foil-like valve metal substrate and the electrical current path of the solid electrolyte capacitor can be further divided, it is possible to deal with a large amount of ripple current. Further, it is possible to increase the degree of freedom of arrangement of wire patterns to be connected to the solid electrolyte capacitor.

In a further preferred aspect of the present invention, a plurality lead electrode pairs are provided so that the anode lead electrodes and the cathode lead electrodes thereof are alternately disposed.

According to this preferred aspect of the present invention, since the anode lead electrodes and the cathode lead electrodes of the plurality of lead electrode pairs on one end portion region of the foil-like valve metal substrate formed with an isolating oxide film on the surface thereof are alternately disposed, magnetic fields generated by electrical current paths thereof can be canceled, thereby sufficiently reducing the ESL. Further, in the case of constituting a multi-terminal type solid electrolytic capacitor in accordance with the present invention, since the electrical current path is divided, it is possible to markedly reduce the ESL.

In a further preferred aspect of the present invention, a plurality of lead electrode pairs are disposed at positions symmetric with respect to each other around a center of gravity of the solid electrolyte capacitor.

According to this preferred aspect of the present invention, the solid electrolyte capacitor can be mounted on a circuit board without considering the polarity of the lead electrodes.

In a further preferred aspect of the present invention, two or more solid electrolyte capacitor components are layered so that the anode lead electrodes and the cathode lead electrodes are directed in the same direction.

According to this preferred aspect of the present invention, since electrode bodies having the same structure are layered, unlike in the case of a ceramic capacitor having a similar terminal structure, it is unnecessary to provide two or more kinds of wiring patterns and, therefore, it is possible to simplify the steps of manufacturing a capacitor. Further, it is possible to provide a solid electrolyte capacitor having larger electrostatic capacitance than that of a ceramic capacitor having a similar terminal structure.

The above objects can be accomplished by a method for manufacturing a solid electrolyte capacitor comprising steps of bonding one end portion region of a valve metal body to at least one end portion region of a foil-like valve metal substrate formed with an isolating oxide film, thereby fabricating an electrode body for a solid electrolyte capacitor component, masking the electrode body so that a part of the valve metal body cannot be subjected to anodic oxidization, dipping the electrode body in a forming solution so that the whole of the foil-like valve metal substrate, the whole portion subjected to masking processing and a part of the valve metal body which has not been subjected to the masking processing are immersed therein, applying voltage to the electrode body to effect anodic oxidization thereon and form an insulating oxide film at least at an edge portion of the foil-like valve metal substrate, forming a solid high molecular polymer electrolyte layer on the substantially entire surface of the foil-like valve metal substrate, coating the solid high molecular polymer electrolyte layer with a conductive paste and drying the conductive paste to form a conductive layer, removing the mask from the valve metal body, mounting at least one solid electrolytic capacitor component thus fabricated on a lead frame, bonding one end portion region of an anode lead portion of the lead frame to the other end portion region of a valve metal body whose surface is not roughened, thereby forming an anode lead electrode, and connecting a cathode lead portion of the lead frame to the conductive layer, thereby forming a cathode lead electrode so as to be drawn out from the conductive layer in a direction parallel to the anode lead electrode.

According to the present invention, in the case where the parallel anode lead electrode and cathode lead electrode of the one lead electrode pair are disposed adjacent to each other, magnetic fields generated by electrical current paths thereof can be canceled, thereby reducing the ESL. Further, in the case of constituting a multi-terminal type solid electrolytic capacitor in accordance with the present invention, since the electrical current path is divided, it is possible to markedly reduce the ESL.

In the present invention, the valve metal substrate is formed of metal or alloy selected from a group consisting of metal capable of forming an insulating oxide film and alloys thereof. Illustrative examples of valve metals preferably usable in the present invention include one kind of metal or alloy of two or more kinds of metal selected from a group consisting of aluminum, tantalum, titanium, niobium and zirconium. Aluminum and tantalum are most preferable. An anodic electrode is formed by processing the metal or alloy into a foil.

In the present invention, the material for making the conductive metal is not particularly limited but may be any type of metal or alloy insofar as it has conductivity. The conductive metal can preferably be made of metal or alloy which can be connected by soldering and more preferably be formed of one kind of metal or alloy of two or more kinds of metal selected from a group consisting of copper, brass, nickel, zinc and chromium. Among these, copper is most preferably used for forming the conductive metal from the viewpoint of electric characteristics, workability in following steps, cost and the like.

In the present invention, the solid high molecular polymer electrolyte layer contains a conductive high molecular polymer compound and is preferably formed on the foil-like valve metal substrate whose surface is roughened and is formed with an insulating oxide film by chemical oxidation polymerization or electrolytic oxidation polymerization.

In the case of forming the solid high molecular polymer electrolyte layer using chemical oxidation polymerization, concretely, the solid high molecular polymer electrolyte layer is formed on the foil-like valve metal substrate whose surface is roughened and is formed with an insulating oxide film in the following manner, for example.

First, a solution containing an oxidizing agent at 0.001 to 2.0 mol/liter or a solution to which a compound serving as a dopant is further added is uniformly applied on the foil-like valve metal substrate whose surface is roughened and formed with an insulating oxide film using a coating method or a spray method.

Then, a solution preferably containing raw monomer of a conductive high molecular polymer compound in an amount of at least 0.01 mol/liter, or raw monomer of a conductive high molecular polymer compound itself, is brought into direct contact with the insulating oxide film formed on the surface of the foil-like valve metal substrate, whereby the raw monomers are polymerized to synthesize a conductive high molecular polymer compound and a solid high molecular polymer electrolyte layer of the conductive high molecular polymer compound is formed on the insulating oxide film formed on the surface of the foil-like valve metal substrate.

In the present invention, as a conductive high molecular polymer compound contained in the solid high molecular polymer electrolyte layer, it is preferable to select a compound whose raw monomer is selected from a group consisting of a substituted or non-substituted TT-conjugated heterocyclic compound, a substituted or non-substituted conjugated aromatic compound and a substituted or non-substituted hetero atom containing conjugated aromatic compound. Among these, a conductive high molecular polymer compound whose raw monomer is a substituted or non-substituted TT-conjugated heterocyclic compound is most preferable. Further, a conductive high molecular polymer compound selected from a group consisting of polyaniline, polypyrrole, polythiophene and polyfuran and derivatives thereof is preferably employed and polyaniline, polypyrrole or polyethylene dioxythiophene is particularly preferable.

In the present invention, illustrative examples of raw monomers of conductive high molecular polymer compounds preferably used for the solid high molecular polymer electrolyte layer include (nonsubstituted) anilines, alkyl anilines, alkoxy anilines, halogenated anilines, ortho-phenylenediamines, 2,6-dialkyl anilines, 5-dialkoxy anilines, 4,4'-diaminodiphenyl ether, pyrrole, 3-methylpyrrole, 3-ethylpyrrole, 3-propylpyrrole, thiophene, methylthiophene, 3-ethylthiophene, 3,4-ethylenedioxythiophene and the like.

In the present invention an oxidizing agent used for chemical oxidization polymerization is not particularly limited and for example, iron(III) salts such as iron(III) chloride, iron(III) sulfide and iron(III) ferricyanide, ceric(IV) salts such as ceric sulfate and ceric ammonium nitrate, halides such as iodine, bromine, bromine iodide and the like, metal halides such as silicon pentafluoride, antimony pentafluoride, silicon tetrafluoride, phosphorus pentachloride, phosphorus pentafluoride, aluminum chloride, molybdenum pentachloride and the like, proton acids such as sulfuric acid, nitric acid, fluorosulfonic acid, trifluoromethanesulfuric acid, chlorosulfuric acid and the like, oxygen compounds such as sulfur trioxide, nitrogen dioxide and the like, persulfates such as sodium persulfate, potassium persulfate, ammonium persulfate and the like, and peroxides such as hydrogen peroxide, potassium permanganate, peracetic acid, difluorosulfonyl peroxiside and the like are preferably used as an oxidizing agent.

In the present invention, illustrative examples of compounds serving as a dopant which are added as occasion demands include salts such as $LiPH_6$, $LiAsF_6$, $NaPF_6$, $KPF_6$, $KAsF_6$ whose anion is hexafluorophosphate anion or hexafluoroarsenate (V) anion and whose cation is an alkaline metal cation such as lithium, sodium, potassium and the like; boron tetrafluorides such as $LiBF_4$, $NaBF_4$, $NH_4BF_4$, $(CH_3)_4NBF_4$, $(n-C_4H_9)_4NBF_4$ and the like; sulfonic acids such as p-toluene sulfonic acid, p-ethyl benzene sulfonic acid, p-hydroxybenzene sulfonic acid, dodecylbenzene sulfonic acid, methyl sulfonic acid, dodecyl sulfonic acid, benzene sulfonic acid, β-naphthalene sulfonic acid or the like and derivatives thereof; alkylnaphthalene/sulfonic acids such as butyinaphthalene sodium sulfonate, 2,6-naphthalene sodium disulfonate, toluene sodium sulfonate, toluene tetrabutyl ammonium sulfonate, or the like and the derivatives thereof; metal halides such as ferric chloride, ferric bromide, cupric chloride, cupric bromide or the like; hydrochloric acid, hydrogen bromide, hydrogen iodide, sulfuric acid, phosphoric acid, nitric acid or alkaline metal salt thereof, alkaline earth metal salt thereof or ammonium salt thereof; halogen acid such as perhalogen acid or a salt thereof such as perchloric acid, sodium perchlorate or the like; inorganic acid or a salt thereof; halogenated carboxylic acids such as monocarboxylic acid or dicarboxylic acid such as acetic acid, oxalic acid, formic acid, butyric acid, succinic acid, lactic acid, citric acid, phthalic acid, maleic acid, benzoic acid, salicylic acid, nicotinic acid or the like, aromatic heterocyclic carboxylic acid, trifluoroacetic acid and salts thereof.

In the present invention, each of the oxidizing agent and the compound serving as a dopant is dissolved in water or an organic solvent and used in the form of a suitable solution. A single kind of solvent or mixed solvents may be used. It is effective to use mixed solvents for increasing the solubility of a compound serving as a dopant. It is preferable for solvents used in mixed solvents to have compatibility therewith and compatibility with an oxidizing agent and the compound serving as a dopant. Illustrative examples of solvents include organic amides, sulphur-containing compounds, esters and alcohols.

On the other hand, in the case of forming the solid high molecular polymer electrolyte layer on the foil-like valve metal substrate whose surface is roughened and is formed with an insulating oxide film by electrolytic oxidation polymerization, as well known, a conductive base layer is used as an operational electrode and immersed together with a counter electrode in an electrolysis solution containing a raw monomer of a conductive high molecular polymer compound and supporting electrolyte and an electric current is supplied to the electrolysis solution, thereby forming a solid high molecular polymer electrolyte layer.

Concretely, a thin conductive base layer is first formed preferably by chemical oxidization polymerization on the foil-like valve metal substrate whose surface is roughened and which is formed with an insulating oxide film. The thickness of the conductive base layer is controlled by controlling the number of repetitions of the polymerization under the same polymerization condition. The number of polymerization repetitions is determined depending upon the kind of raw monomer.

The conductive base layer may be formed of metal, metal oxide having conductivity or a conductive high molecular polymer compound but it is preferable to form the conductive base layer of a conductive high molecular polymer compound. As the raw monomer for forming the conductive base layer, a raw monomer used for chemical oxidization polymerization can be employed and in such a case, a conductive high molecular polymer compound contained in the conductive base layer is the same as that contained in the solid high molecular polymer electrolyte layer formed by chemical oxidization polymerization. In the case where ethylene dioxythiophene or pyrrole is employed as raw monomer for forming the conductive base layer, the conductive base layer may be formed by determining the number of polymerization repetitions so that an amount of the conductive high molecular polymer compound to be produced becomes equal to 10% to 30% of the amount of the conductive high molecular polymer compound produced when the solid high molecular polymer electrolyte layer is formed only by chemical oxidization polymerization.

Thereafter, the conductive base layer is used as an operational electrode and immersed together with a counter electrode in an electrolysis solution containing a raw monomer of a conductive high molecular polymer compound and supporting electrolyte and an electric current is supplied to the electrolysis solution, thereby forming a solid high molecular polymer electrolyte layer.

Various additives may as occasion demands be added to an electrolytic solution in addition to raw monomer of a conductive high molecular polymer compound and supporting electrolyte.

The conductive high molecular polymer compound usable for forming the solid high molecular polymer electrolyte layer is the same as that used for the conductive base layer and, therefore, the same as that used for chemical oxidization polymerization, and it is preferable to select a conductive high molecular polymer compound whose raw monomer is selected from a group consisting of a substituted or non-substituted TT-conjugated heterocyclic compound, a substituted or non-substituted conjugated aromatic compound and a substituted or non-substituted hetero atom containing conjugated aromatic compound. Among these, a conductive high molecular polymer compound whose raw monomer is a substituted or non-substituted TT-conjugated heterocyclic compound is most preferable. Further, a conductive high molecular polymer compound selected from a group consisting of polyaniline, polypyrrole, polythiophene and polyfuran and derivatives thereof is preferably employed and polyaniline, polypyrrole or polyethylene dioxythiophene is particularly preferable.

The supporting electrolyte is selected depending upon the combination of a monomer and a solvent and illustrative examples of the supporting electrolyte include sodium hydroxide, potassium hydroxide, ammonium hydroxide, sodium carbonate, sodium acid carbonate and the like as a basic compound, sulfuric acid, hydrochloric acid, nitric acid, hydrogen bromide, perchloric acid, trifluoroacetic acid, sulfonic acid and the like as an acidic compound, and sodium chloride, sodium bromide, potassium iodide, potassium chloride, potassium nitrate, sodium periodate, sodium perchlorate, lithium perchlorate, ammonium iodide, ammonium chloride, fluorobotate, tetramethylammonium chloride, tetraethylammonium chloride, tetramethylammonium bromide, tetraethylammonium bromide, tetraethylammonium perchloride, tetrabutylammonium perchloride, tetramethylammonium, D-toluenesulfonic acid chloride, poly(di-salicylic acid triethylamine), 10-camphorsulfonic acid sodium salt and the like as a salt.

In the present invention, the concentration of the supporting electrolyte may be determined so as obtain desired electrical current density and is not particularly limited. The concentration of the supporting electrolyte is generally set to 0.05 to 1.0 mol/liter.

In the present invention, the solvent used for electrolytic oxidation polymerization is not particularly limited and may be selected from water, a protic solvent, an aprotic solvent or a mixed solvent containing two or more these solvents. As the mixed solvent, it is preferable to select a mixed solvent containing solvents having compatibility and compatible with the monomer and the supporting electrolyte.

Illustrative examples of a protic solvent usable in the present invention include formic acid, acetic acid, propionic acid, methanol, ethanol, n-propanol, iso-propanol, tert-butanol, methyl cellosolve, diethylamine, ethylenediamine and the like.

Illustrative examples of an aprotic solvent usable in the present invention include methylene chloride, 1,2-dichloroethane, carbon disulfide, acetonitrile, acetone, propylene carbonate, nitromethane, nitrobenzene, ethyl acetate, diethyl ether, tetrahydrofuran, dimethoxyethane, dioxane, N,N-dimethylacetamide, N,N-dimethylformamide, pyridine, dimethyl sulfoxide and the like.

In the present invention, in the case where the solid high molecular polymer electrolyte layer is formed by electrolytic oxidation polymerization, any of a constant voltage method, a constant electrical current method and a potential sweep method may be employed. Further, during the process of electrolytic oxidation polymerization, a conductive high molecular polymer compound may be polymerized by combining the constant voltage method and the constant electrical current method. The electrical current density is not particularly limited but is about 500 mA/cm$^2$ at the maximum.

In the present invention, as disclosed in Japanese Patent Application Laid Open No. 2000-100665, chemical oxidation polymerization or electrolytic oxidation polymerization can be performed while an ultrasonic wave is being projected, thereby polymerizing a conductive high molecular polymer compound. In the case of polymerizing a conductive high molecular polymer compound while an ultrasonic wave is being projected, the film quality of the solid high molecular polymer electrolyte layer can be improved.

In the present invention, the thickness of the solid high molecular polymer electrolyte layer is not particularly limited insofar as raised and depressed portions formed on the surface of an anode electrode formed by the etching process or the like can be completely filled by the solid high molecular polymer electrolyte layer. The thickness of the solid high molecular polymer electrolyte layer is generally 5 to 100 μm.

In the present invention, the solid electrolytic capacitor further includes a conductive layer serving as a cathode electrode on the solid high molecular polymer electrolyte layer and a graphite paste layer and a silver paste layer may be formed as the conductive layer. The graphite paste layer and the silver paste layer can be formed by a screen printing method, a spray coating method or the like. Although the cathode electrode can be formed by only the silver paste layer, in the case of further forming the graphite paste layer, it is possible to prevent the migration of silver in comparison with the case of forming only the silver paste layer.

When the graphite paste layer and the silver paste layer are to be formed as the cathode electrode, portions other than a portion corresponding to that of the foil-like valve metal substrate whose surface is roughened and which is formed with an insulating oxide film are masked by a metal mask or the like and the graphite paste layer and the silver paste layer are formed at only the portion corresponding to that of the foil-like valve metal substrate whose surface is roughened and which is formed with an insulating oxide film.

DETAILED DESCRIPTION OF THE INVENTION

Hereinafter, preferred embodiments of the present invention will be described in detail with reference to accompanying drawings.

Figure 1:
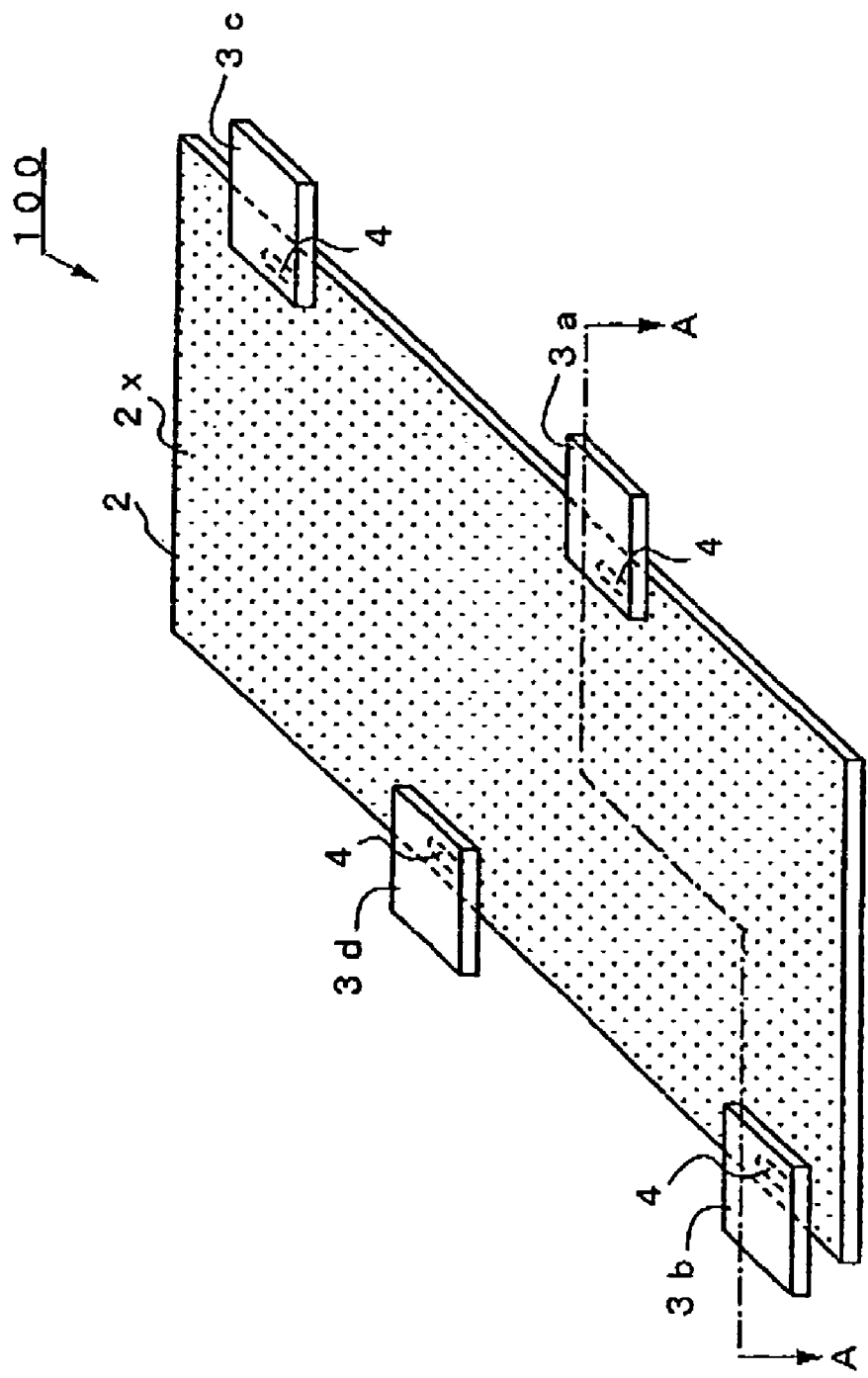
FIG. 1 is a schematic perspective view showing an electrode body for a solid electrolytic capacitor component (hereinafter sometimes simply referred to as an electrode) used for a solid electrolytic capacitor which is a preferred embodiment of the present invention.
Figure 2:
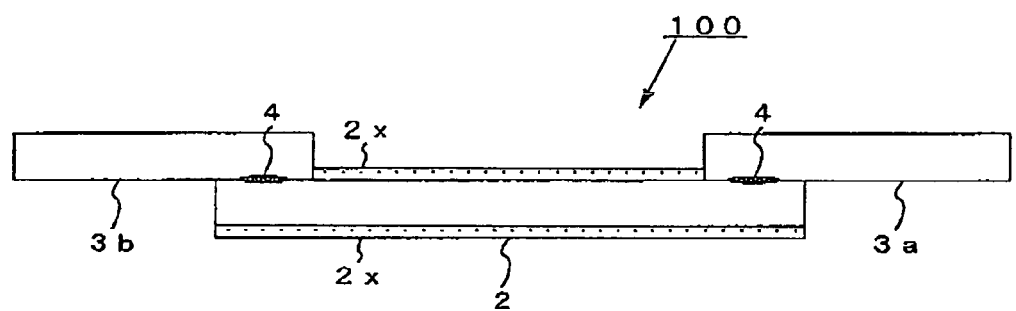
FIG. 2 is a schematic cross sectional view of an electrode body for a solid electrolytic capacitor component taken along a line A—A in FIG. 1.

FIG. 1 is a schematic perspective view showing an electrode body for a solid electrolytic capacitor component (hereinafter sometimes simply referred to as an electrode) used for a solid electrolytic capacitor which is a preferred embodiment of the present invention and FIG. 2 is a schematic cross sectional view of the electrode body for a solid electrolytic capacitor component taken along a line A—A in FIG. 1.

In this embodiment, aluminum is used as a valve metal capable of forming an insulating oxide film and as shown in FIGS. 1 and 2, an electrode body 100 of the solid electrolytic capacitor according to this embodiment includes a foil-like aluminum substrate 2 whose surface is roughened or enlarged and which is formed with an aluminum oxide film 2x on the surface thereof as an insulating oxide film and foil-like aluminum substrates 3a to 3d whose surfaces are not roughened.

To each of opposite edge portion regions of the foil-like aluminum substrate 2 whose surface is roughened and which is formed with an aluminum oxide film 2x on the surface thereof, one end portion region of each of the foil-like aluminum substrates 3a and 3b or 3c and 3d whose surfaces are not roughened is bonded by ultrasonic welding so that electrical connection can be established between the valve metals and the foil-like aluminum substrates 3a and 3c and the foil-like aluminum substrate 3b and 3d are spaced with a constant interval.

When the electrode body 100 is to be formed, the foil-like aluminum substrate 2 is first cut so as to have a predetermined size from an aluminum foil sheet whose surface is roughened and which is formed with an aluminum oxide film on the surface thereof and foil-like aluminum substrates 3a to 3d are further cut so as to have a predetermined size from an aluminum foil sheet whose surface is not roughened. At this time, the width of each of the foil-like aluminum substrates 3a to 3d is determined to be sufficiently smaller than the width of the foil-like aluminum substrate 2 so that at least two lead electrode pairs each including an anode lead electrode and a cathode lead electrode can be provided at each of the opposite edge portions of the foil-like aluminum substrate 2 so as to be alternately disposed.

One end portion region of each the foil-like aluminum substrates 3a to 3d whose surfaces are not roughened is superposed on each of the opposite edge portions of the foil-like aluminum substrate 2 whose surface is roughened and the aluminum oxide film 2x on the surface thereof in such a manner that end portion regions thereof having predetermined areas are overlapped. Here, the foil-like aluminum substrates 3a to 3d are disposed at positions symmetric with respect to each other around the center of gravity of the foil-like aluminum substrate 2 whose surface is roughened. The center of gravity of the foil-like aluminum substrate 2 is defined as a point on the foil-like aluminum substrate 2 where diagonal lines of the rectangular foil-like aluminum substrate 2 intersect with each other. Further, the areas of the end portion region of each of the foil-like aluminum substrate 3a to 3d whose surface is not roughened and the end portion region of the foil-like aluminum substrate 2 to be superposed are determined so that the connected portion can have a predetermined strength.

Each of the edge portion regions of the foil-like aluminum substrate 2 whose surface is roughened and the end portion region of each of the foil-like aluminum substrate 3a to 3d whose surface is not roughened superposed in this manner are connected to each other by ultrasonic welding, thereby forming a welding connected portion 4. Here, the aluminum oxide film 2x is removed by connecting the end portion regions of the foil-like aluminum substrates 3a to 3d whose surfaces are not roughened and the edge portion regions of the foil-like aluminum substrate 2 whose surface is roughened by ultrasonic welding, whereby the edge portion regions of the foil-like aluminum substrate 2 whose surface is roughened and the end portion regions of the foil-like aluminum substrates 3a to 3d whose surfaces are not roughened are connected to each other so that electrical connection can be established between aluminum metals.

Since the foil-like aluminum substrate 2 whose surface is roughened and which is formed with the aluminum oxide film 2x on the surface thereof is cut from an aluminum foil sheet, no aluminum oxide film is formed on an edge portion thereof and, therefore, it is required to form an aluminum oxide film on an edge portion of the foil-like aluminum substrate 2 whose surface is roughened by anodic oxidation in order to use the thus formed electrode body 100 as an anodic electrode of a solid electrolytic capacitor.

Figure 3:
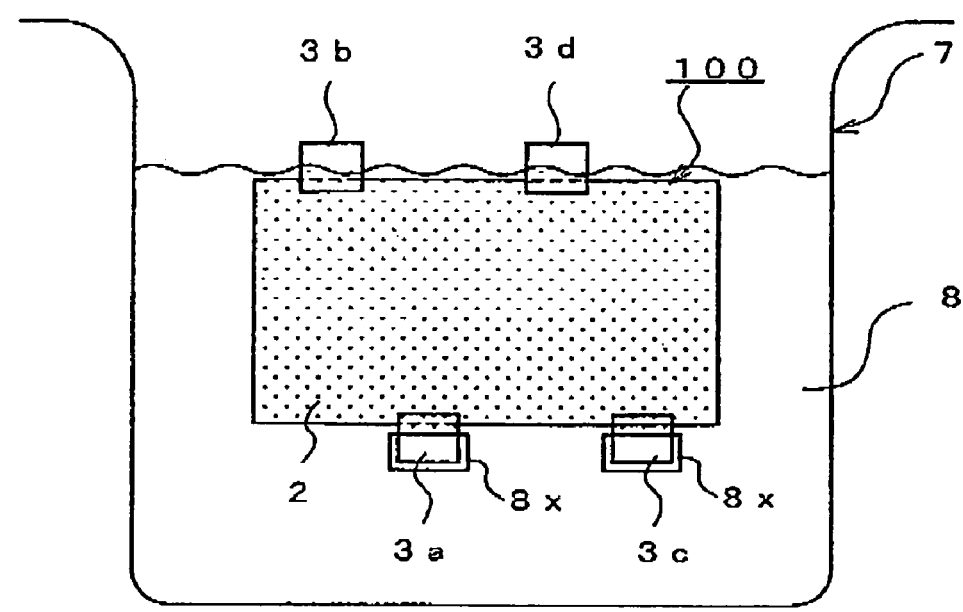
FIG. 3 is a schematic cross sectional view showing an anodic oxidization method for forming an aluminum oxide film on an edge portion of a foil-like aluminum substrate 2 whose surface is roughened.

FIG. 3 is a schematic cross sectional view showing an anodic oxidation method for forming an aluminum oxide film on an edge portion of the foil-like aluminum substrate 2 whose surface is roughened.

As shown in FIG. 3, a part of the foil-like aluminum substrate 3a or 3c whose surface is not roughened and which is formed at one of the edge portion regions of the foil-like aluminum substrate 2 whose surface is roughened and is not superposed on the foil-like aluminum substrate 2 is first masked with thermosetting resist 8x. Then, the electrode body 100 is set in a forming solution 8 consisting of an ammonium adipate solution accommodated in a beaker 7 made of stainless steel in such a manner that the whole foil-like aluminum substrate 2 whose surface is roughened, the whole foil-like aluminum substrates 3a and 3c which have been subjected to mask processing and a part of the foil-like aluminum substrates 3b and 3d which have not been subjected to mask processing are immersed in the forming solution 8 and voltage is applied with the foil-like aluminum substrate 3b or 3d whose surface is not roughened to the plus side and the beaker 7 made of stainless steel connected to the minus side.

The applied voltage can be determined in accordance with the thickness of the aluminum oxide film to be formed and when an aluminum oxide film having a thickness of 10 nm to 1 μm is to be formed, the applied voltage is normally determined to be several volts to about twenty volts.

As a result, anodic oxidation is started. Although the forming solution 8 moves upward due to the capillary phenomenon during the anodic oxidation operation since the surface of the foil-like aluminum substrate 2 is roughened, it does not move upward to the foil-like aluminum substrate 3b or 3d beyond the connected portion of the foil-like aluminum substrate 2 whose surface is roughened and the foil-like aluminum substrate 3b or 3d whose surface is not roughened since the surface of the foil-like aluminum substrate 3b or 3d is not roughened. Further, since the part of the foil-like aluminum substrate 3a or 3c whose surface is not roughened is masked with thermosetting resist 8*x*, it does not come into contact with the forming solution 8.

Therefore, an aluminum oxide film is formed on only a region which includes the whole surface of the foil-like aluminum substrate 2 whose surface is roughened including an edge portion thereof and parts of the foil-like aluminum substrates 3*a* and 3*d* whose surfaces are not roughened and which are connected to the foil-like aluminum substrate 2 whose surface is roughened.

On the whole surface of the foil-like aluminum substrate 2 whose surface is roughened and which is formed with the aluminum oxide film on the surface thereof of the thus fabricated electrode body 100, a cathode electrode of conductive high molecular polymer or the like is formed by a well known process, thereby fabricating a solid electrolytic capacitor component.

Figure 4:
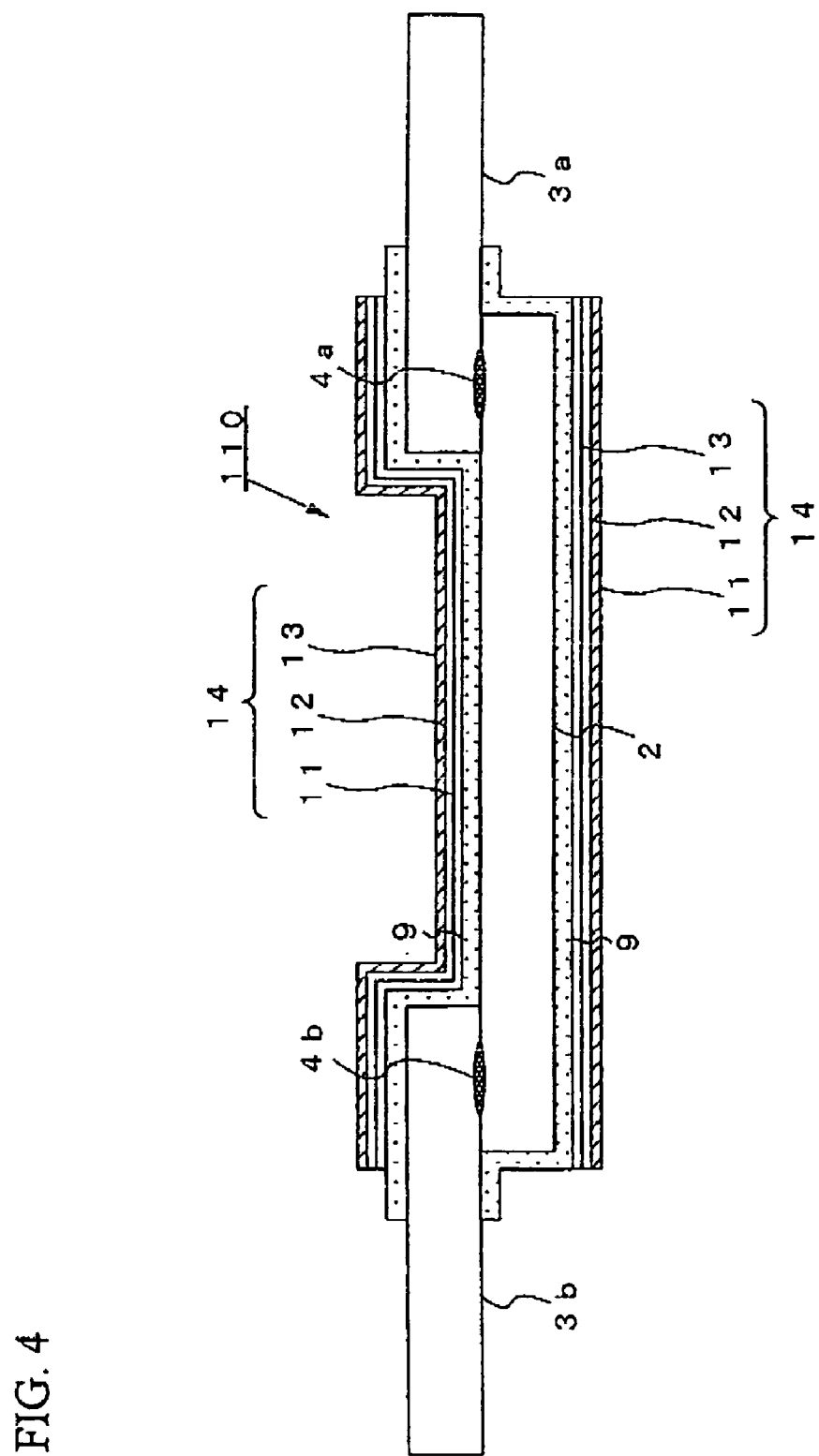
FIG. 4 is a schematic cross sectional view showing a solid electrolytic capacitor component.

FIG. 4 is a schematic cross sectional view showing a solid electrolytic capacitor component.

As shown in FIG. 4, the solid electrolytic capacitor component 110 includes a cathode electrode 14 formed by laminating a solid high molecular polymer electrolyte layer 11, a graphite paste layer 12 and a silver paste layer 13 on substantially the whole surface of the foil-like aluminum substrate 2 whose surface is roughened and which is formed with the aluminum oxide film 9.

The solid high molecular polymer electrolyte layer 11 containing conductive high molecular polymer is formed by chemical oxidation polymerization or electrolytic oxidation polymerization on substantially the whole surface of the foil-like aluminum substrate 2 whose surface is roughened and which is formed with the aluminum oxide film 9, and the graphite paste layer 12 and the silver paste layer 13 (conductive layers) are formed on the solid high molecular polymer electrolyte layer 11 by the screen printing method or the spray coating method.

The thus fabricated solid electrolytic capacitor component 110 is mounted on a lead frame after removing the mask of thermosetting resist 8*x* and the solid electrolytic capacitor component 10 is connected to an anode lead electrode and a cathode lead electrode formed in the lead frame in advance. Then, the solid electrolytic capacitor component 110 is molded, whereby a discrete type solid electrolytic capacitor is fabricated.

Figure 5:
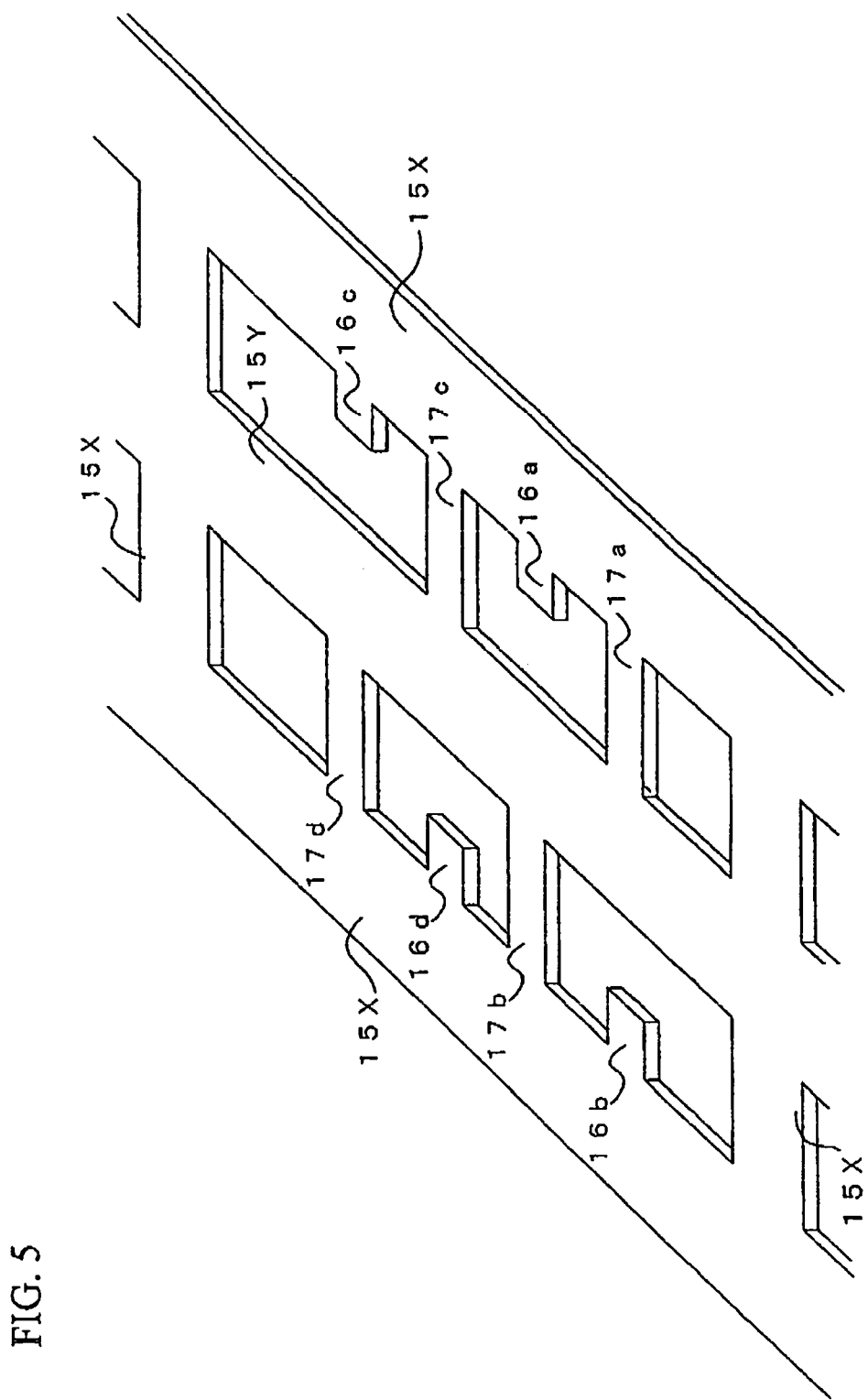
FIG. 5 is a schematic perspective view showing the structure of a lead frame.
Figure 6:
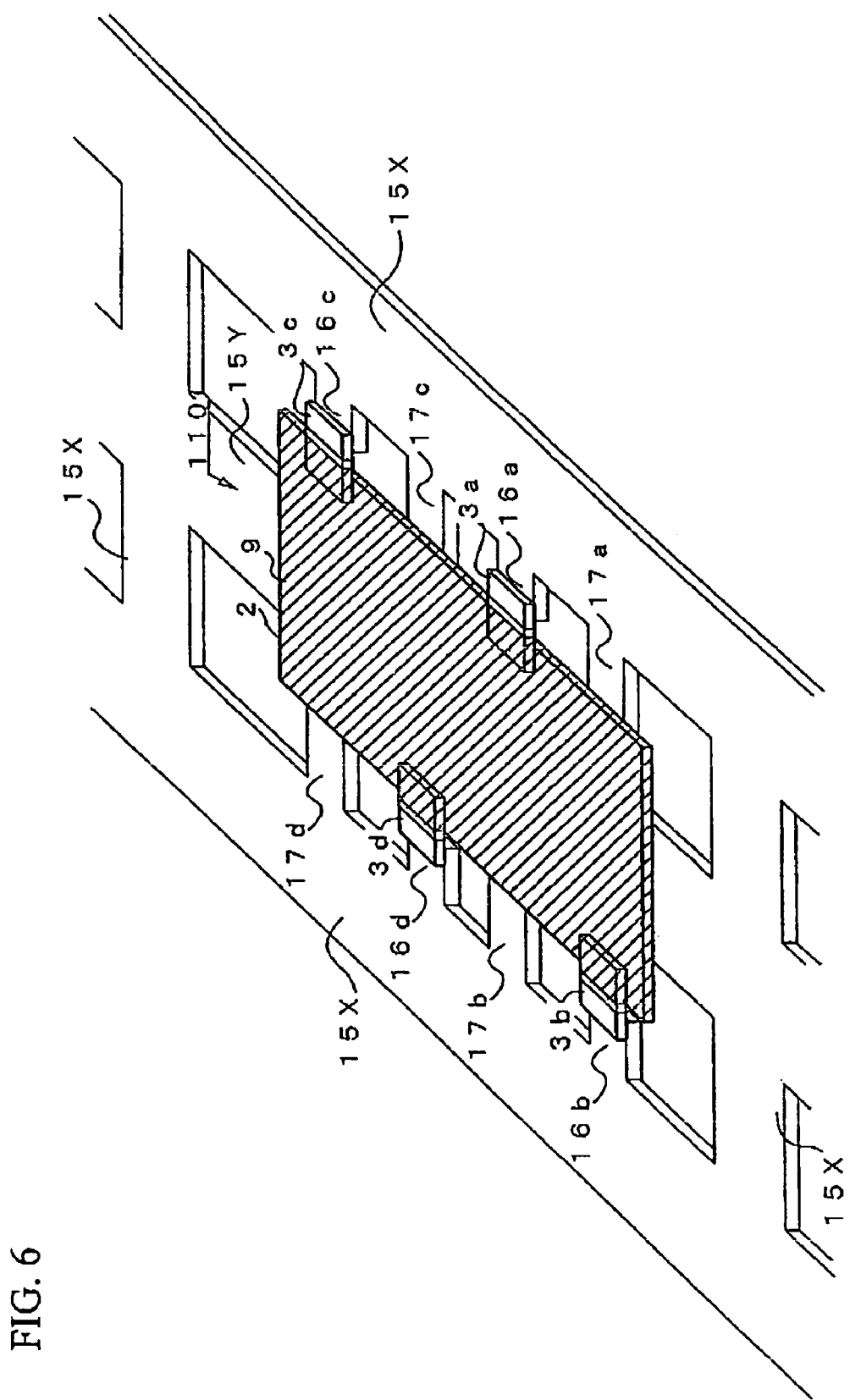
FIG. 6 is a schematic perspective view showing a plurality of solid electrolytic capacitor components mounted on a lead frame.

FIG. 5 is a schematic perspective view showing the structure of a lead frame and FIG. 6 is a schematic perspective view showing solid electrolytic capacitor components mounted on the lead frame.

As shown in FIGS. 5 and 6, the lead frame 15 is fabricated by punching out a phosphor bronze substrate so as to have a predetermined size for mounting the solid electrolytic capacitor component 110 thereon. A band-like island portion 15Y is provided at the center portion of a main frame 15X located at the circumferential portion of the lead frame 15 and four anode lead electrode portions 16*a* to 16*d* projecting from the main frame 15X toward the island portion 15Y are provided in a direction perpendicular to the island portion 15Y. Further, four cathode lead electrode portions 17*a* to 17*d* are provided so as to be spaced from the anode lead electrode portions 16*a* to 16*d* in parallel therewith and connect the main frame 15X and the island portion 15Y.

The solid electrolytic capacitor component 110 is mounted on the island portion 15Y of the lead frame 15 and fixed thereto by adhering the island portion 15Y and the conductive layer 13 located on the lower surface of the solid electrolytic capacitor component 110 using a silver system conductive adhesive agent. End portion regions of the foil-like aluminum substrates 3*a* to 3*d* whose surfaces are not roughened are superposed on end portion regions of the four anode lead electrode portions 16*a* to 16*d* formed in the lead frame 15 in advance and welded using a laser spot welding machine to be connected to the anode lead electrode portions 16*a* to 16*d*.

Figure 7:
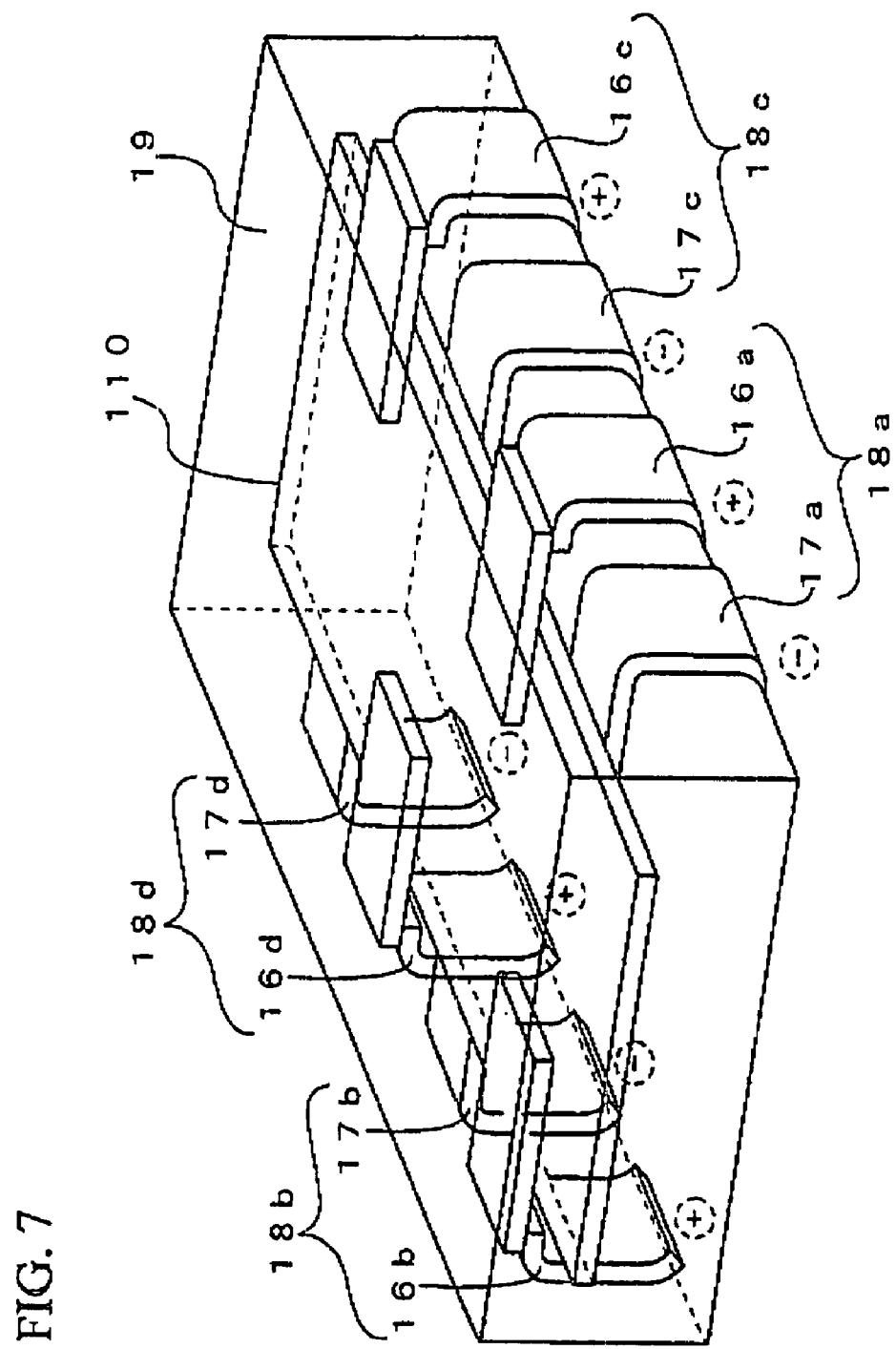
FIG. 7 is a schematic perspective view showing a discrete type solid electrolytic capacitor.

FIG. 7 is a schematic perspective view showing a discrete type solid electrolyte capacitor.

As shown in FIG. 7, after the solid electrolytic capacitor component 110 has been fixed to the lead frame 15, it is molded with epoxy resin 19 by injection molding or transfer molding. The solid electrolytic capacitor component molded with the epoxy resin 19 is removed from the lead frame and an anode lead electrode is formed by folding the anode lead electrode portions 16*a* to 16*d*. Further, a cathode lead electrode is formed by folding the cathode lead electrode portions 17*a* to 17*d*.

The thus fabricated solid electrolytic capacitor component 110 includes a lead electrode pair 18*a* including the anode lead electrode 16*a* and the cathode lead electrode 17*a* and a lead electrode pair 18*c* including the anode lead electrode 16*c* and the cathode lead electrode 17*c* on one edge portion region thereof and a lead electrode pair 18*b* including the anode lead electrode 16*b* and the cathode lead electrode 17*b* and a lead electrode pair 18*d* including the anode lead electrode 16*d* and the cathode lead electrode 17*d* on the other edge portion region thereof. Since the anode lead electrodes and the cathode lead electrodes are alternately disposed in this manner, magnetic fields generated by electrical currents flowing the anode lead electrodes and magnetic fields generated by electrical currents flowing the cathode lead electrodes can be canceled and, therefore, the ESL can be reduced.

As described above, according to this embodiment, since the one end portion region of each of the foil-like aluminum substrates 3*a* to 3*d* whose surfaces are not roughened is bonded to one of the opposite edge portion regions of the foil-like aluminum substrate 2 whose surface is roughened and which is formed with the aluminum oxide film on the surface thereof and the foil-like copper substrate 16*a* to 16*d* are bonded to the other edge portion region of the foil-like aluminum substrate 2, whereby the solid electrolytic capacitor component 110 is constituted, it is possible to fabricate a solid electrolytic capacitor component 110 having good electrical characteristics.

Further, according to this embodiment, since the solid electrolytic capacitor component 110 is constituted as a multi-terminal type solid electrolytic capacitor component, it is possible to reduce the ESL by dividing an electrical current path and obtain a solid electrolytic capacitor having good electric characteristics, i.e., whose initial characteristic values are good and do not vary substantially.

Furthermore, according to this embodiment, since at least one lead electrode pair is provided at one of the edge portions of the foil-like aluminum substrate 2 whose surface is roughened and which is formed with the aluminum oxide film on the surface thereof, high frequency electrical currents flow in the adjacent lead electrodes so that the polarities thereof are different from each other. therefore, since magnetic fluxes generated in the adjacent lead electrodes are canceled, it is possible to reliably reduce the ESL.

Moreover, according to this embodiment, since the thus fabricated solid electrolytic capacitor component 110 has a foil-like shape, even if the solid electrolytic capacitor components are layered to fabricate a solid electrolyte capacitor, the thickness of the thus obtained solid electrolytic capacitor is very small and therefore, it is possible to layer solid electrolytic capacitor components having the same electrode arrangement and fabricate a solid electrolyte capacitor having large electrostatic capacitance. Further, it is possible to provide a discrete type solid electrolytic capacitor by molding a solid electrolytic capacitor component with resin.

Figure 8:
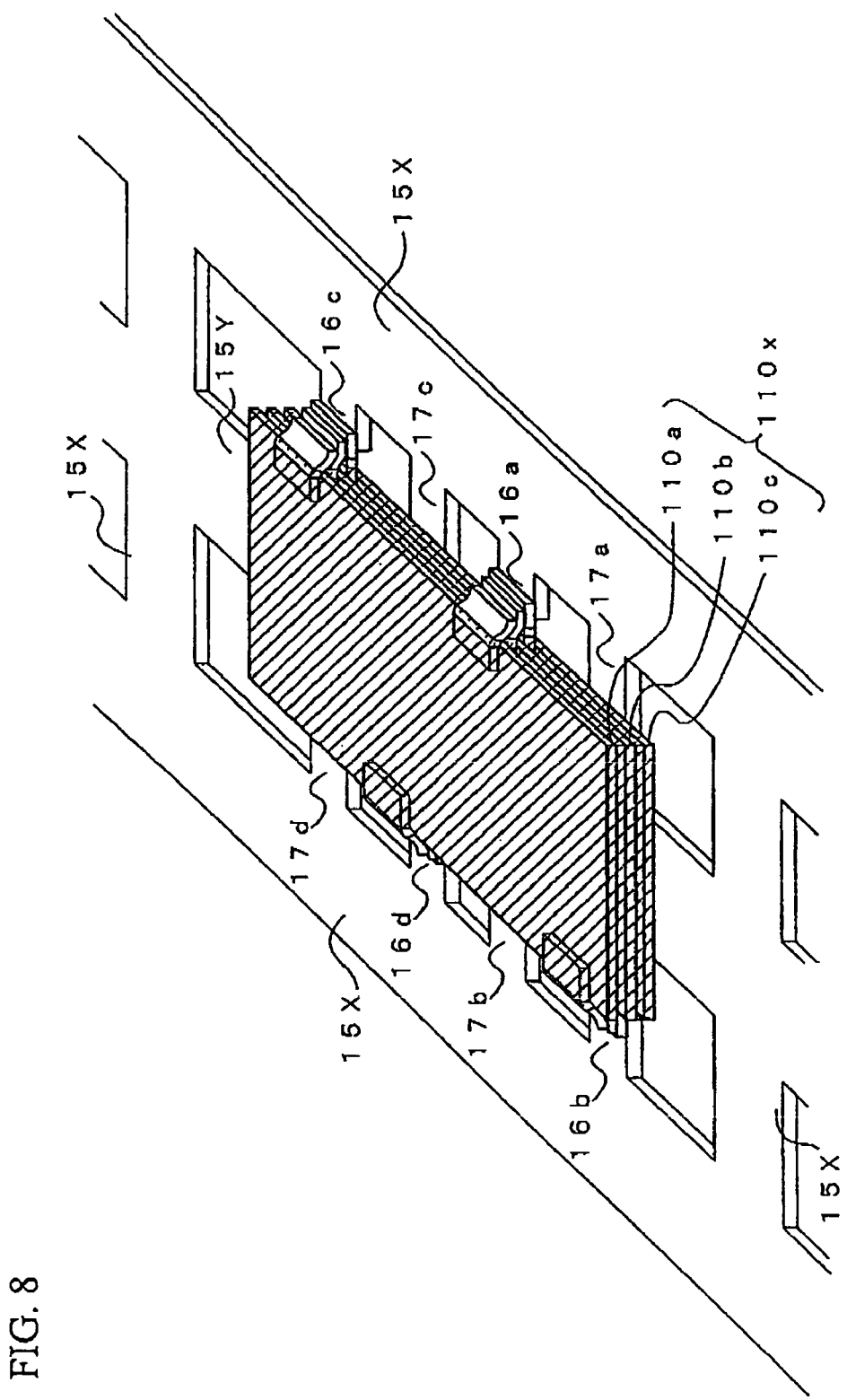
FIG. 8 is a schematic perspective view showing a multi-layered body of solid electrolytic capacitor components which is a further preferred embodiment of the present invention, mounted on a lead frame.

FIG. 8 is a schematic perspective view showing a multi-layered body of solid electrolytic capacitor components which is a further preferred embodiment of the present invention, wherein it is mounted on a lead frame.

As shown in FIG. 8, the multi-layered body 110x of solid electrolytic capacitor components is constituted by layering three solid electrolytic capacitor components 10 shown in FIGS. 5 and 6.

The multi-layered body 110x of solid electrolytic capacitor components including the three solid electrolytic capacitor components 110a, 110b and 110c is fabricated by superposing the solid electrolytic capacitor components 110a, 110b and 110c in such a manner that the respective portions thereof are directed in the same direction and adhering them using a silver system conductive adhesive agent so that the conductive layers thereof are electrically connected. The lower surface of the foil-like aluminum substrate 2 whose surface is roughened and the upper surfaces of the foil-like aluminum substrates 3a to 3d whose surfaces are not roughened are fixed to each other by ultrasonic welding or crimping.

The thus constituted multi-layered body 110x of solid electrolytic capacitor components is mounted on the lead frame 15 similarly to the solid electrolytic capacitor component 110 and is fixed thereto by adhering a support portion 15y of the lead frame and the lowermost conductive layer of the multi-layered body 110x using a conductive adhesive agent and connecting it to the anode lead electrode portions 16a to 16d of the lead frame 15 by ultrasonic welding. Further, it is molded with resin, thereby fabricating a discrete type solid electrolyte capacitor.

As described above, according to this embodiment, since a solid electrolyte capacitor is constituted by the foil-like multi-layered body 110x of solid electrolytic capacitor components, it is possible to provide a solid electrolyte capacitor having a very small thickness and large electrostatic capacitance.

Figure 9:
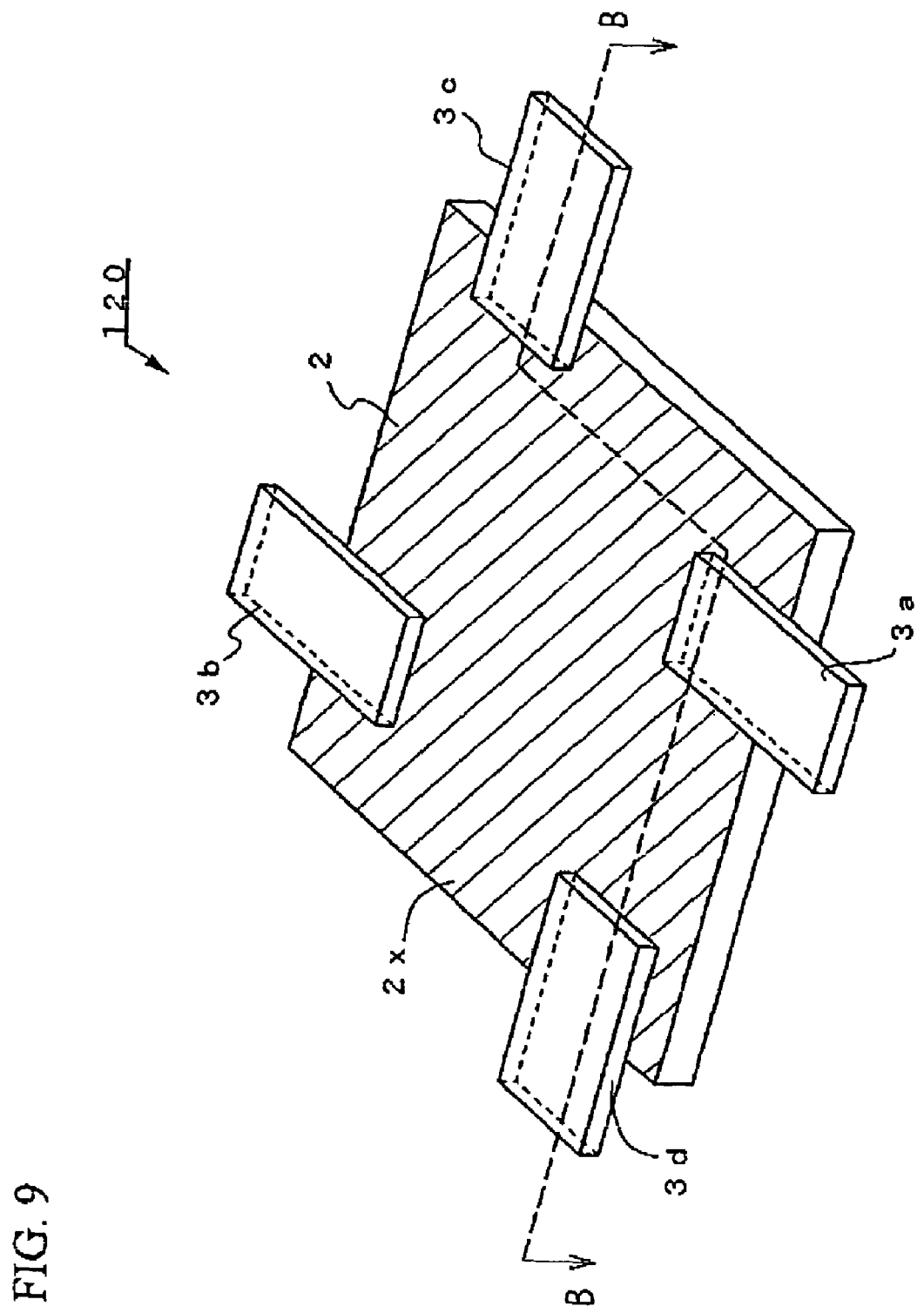
FIG. 9 is a schematic perspective view showing an electrode body for a solid electrolytic capacitor component used for a solid electrolytic capacitor which is a still further preferred embodiment of the present invention.
Figure 10:
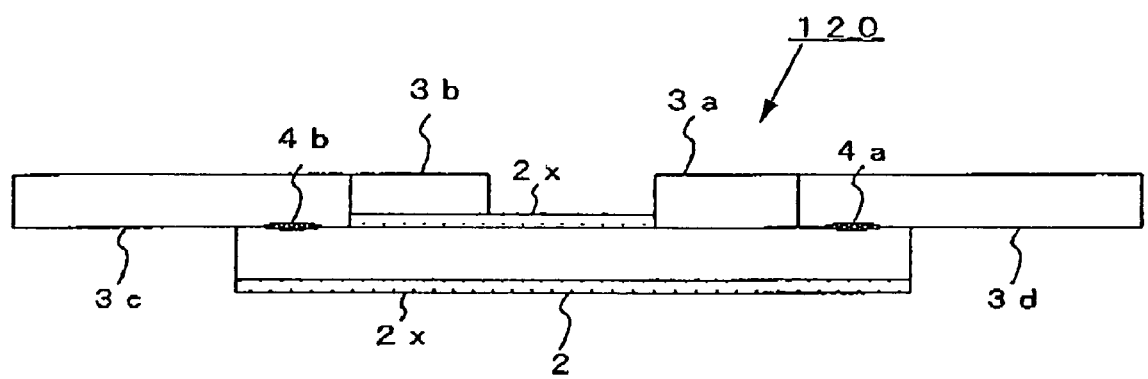
FIG. 10 is a schematic cross sectional view of an electrode body for a solid electrolytic capacitor component taken along a line B—B in FIG. 9.

FIG. 9 is a schematic perspective view showing an electrode body for a solid electrolytic capacitor component used for a solid electrolytic capacitor which is a still further preferred embodiment of the present invention and FIG. 10 is a schematic cross sectional view of an electrode body for a solid electrolytic capacitor component taken along a line B—B in FIG. 9.

In this embodiment, aluminum is used as a valve metal capable of forming an insulating oxide film and as shown in FIGS. 9 and 10, an electrode body 120 of the solid electrolytic capacitor according to this embodiment includes a foil-like aluminum substrate 2 whose surface is roughened or enlarged and which is formed with an aluminum oxide film 2x on the surface thereof as an insulating oxide film and foil-like aluminum substrates 3a to 3d whose surfaces are not roughened.

As shown in FIGS. 9 and 10, the electrode body 120 of the solid electrolytic capacitor according to this embodiment is fabricated by bonding using ultrasonic welding one end portion region of each of the foil-like aluminum substrates 3a to 3d whose surfaces are not roughened to one of four edge portion regions of the foil-like aluminum substrate 2 whose surface is roughened and which is formed with an aluminum oxide film 2x on the surface thereof so that electrical connection can be established between the valve metals.

When the electrode body 120 is to be formed, the foil-like aluminum substrate 2 is first cut so as to have a predetermined size from an aluminum foil sheet whose surface is roughened and which is formed with an aluminum oxide film on the surface thereof and foil-like aluminum substrates 3 are further cut so as to have a predetermined size from an aluminum foil sheet whose surface is not roughened. At this time, the width of each of the foil-like aluminum substrates 3 is determined to be sufficiently smaller than the width of the foil-like aluminum substrate 2 so that one lead electrode pair including an anode lead electrode and a cathode lead electrode can be provided at each of the four edge portion regions of the foil-like aluminum substrate 2.

One end portion region of each the foil-like aluminum substrates 3a to 3d whose surfaces are not roughened is superposed on each of the four edge portion regions of the foil-like aluminum substrate 2 whose surface is roughened in such a manner that end portion regions thereof having predetermined areas are overlapped. Here, the foil-like aluminum substrates 3a to 3d are disposed at positions symmetric with respect to each other around the center of gravity of the foil-like aluminum substrate 2 whose surface is roughened and close to the corners of the foil-like aluminum substrate 2 so that cathode lead electrodes can be disposed adjacent with each other. Further, the areas of the end portion region of each of the foil-like aluminum substrates 3a to 3d whose surfaces are not roughened and the end portion region of the foil-like aluminum substrate 2 to be superposed are determined so that the connected portion can have a predetermined strength.

Each of the edge portion regions of the foil-like aluminum substrate 2 whose surface is roughened and the end portion region of each of the foil-like aluminum substrates 3a to 3d whose surfaces are not roughened superposed in this manner are connected to each other by ultrasonic welding, thereby forming a welding connected portion 4. Here, the aluminum oxide film 2x is removed by connecting the end portion regions of the foil-like aluminum substrates 3a to 3d whose surfaces are not roughened and the edge portion regions of the foil-like aluminum substrate 2 whose surface is roughened by ultrasonic welding, whereby the edge portion regions of the foil-like aluminum substrate 2 whose surface is roughened and the end portion regions of the foil-like aluminum substrates 3a to 3d whose surfaces are not roughened are connected to each other so that electrical connection can be established between aluminum metals.

Since the foil-like aluminum substrate 2 whose surface is roughened and which is formed with the aluminum oxide film 2x on the surface thereof is cut from an aluminum foil sheet, no aluminum oxide film is formed on an edge portion thereof and, therefore, it is required to form an aluminum oxide film on an edge portion of the foil-like aluminum substrate 2 whose surface is roughened by anodic oxidation in order to use the thus formed electrode body 100 as an anodic electrode of a solid electrolytic capacitor.

Figure 11:
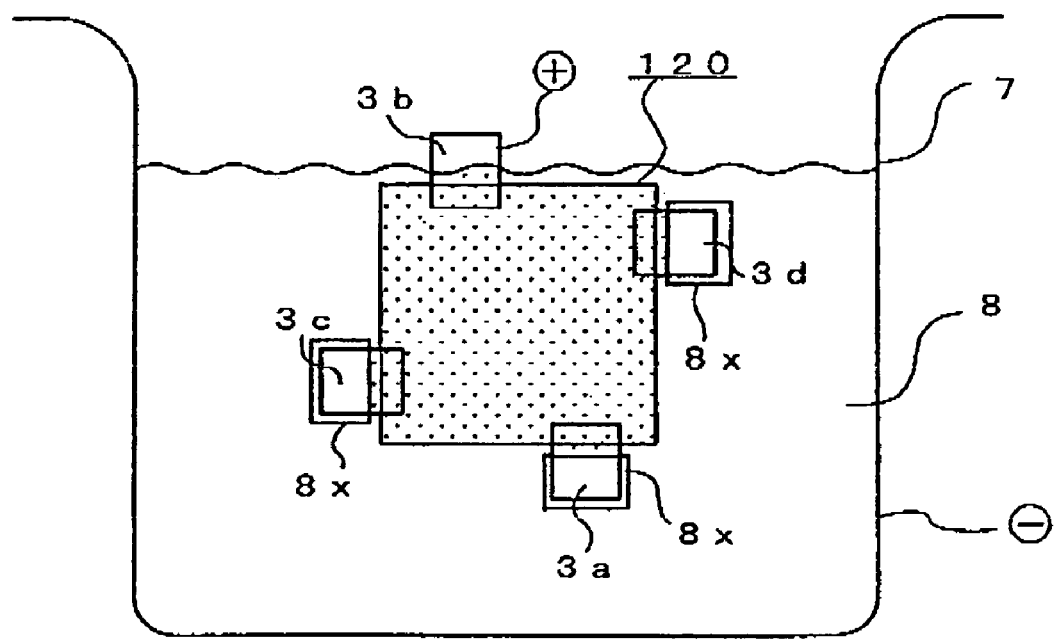
FIG. 11 is a schematic cross sectional view showing an anodic oxidization method for forming an aluminum oxide film on an edge portion of a foil-like aluminum substrate 2 whose surface is roughened.

FIG. 11 is a schematic cross sectional view showing an anodic oxidation method for forming an aluminum oxide film on an edge portion of the foil-like aluminum substrate 2 whose surface is roughened.

As shown in FIG. 11, a part of each of the foil-like aluminum substrates 3a, 3c and 3d whose surfaces are not roughened and which are formed at the three edge portion regions of the foil-like aluminum substrate 2 whose surface is roughened and are not superposed on the foil-like aluminum substrate 2 is first masked with thermosetting resist 8x. Then, the electrode body 120 is set in a forming solution 8 consisting of an ammonium adipate solution accommodated in a beaker 7 made of stainless steel in such a manner that the whole foil-like aluminum substrate 2 whose surface is roughened, the whole foil-like aluminum substrates 3a, 3c and 3d which have been subjected to mask processing and a part of the foil-like aluminum substrate 3b which has not been subjected to mask processing are immersed in the forming solution 8 and voltage is applied with the foil-like aluminum substrate 3b whose surface is not roughened to the plus side and the beaker 7 made of stainless steel connected to the minus side.

The applied voltage can be determined in accordance with the thickness of the aluminum oxide film to be formed and when an aluminum oxide film having a thickness of 10 nm to 1 μm is to be formed, the applied voltage is normally determined to be several volts to about twenty volts.

As a result, anodic oxidation is started. Although the forming solution 8 moves upward due to the capillary phenomenon during the anodic oxidation operation since the surface of the foil-like aluminum substrate 2 is roughened, it does not move upward to the foil-like aluminum substrate 3b beyond the connected portion of the foil-like aluminum substrate 2 whose surface is roughened and the foil-like aluminum substrate 3b whose surface is not roughened since the surface of the foil-like aluminum substrate 3b is not roughened. Further, since the part of each of the foil-like aluminum substrates 3a, 3c and 3d whose surfaces are not roughened are masked with thermosetting resist 8x, they do not come into contact with the forming solution 8.

Therefore, an aluminum oxide film is formed on only a region which includes the whole surface of the foil-like aluminum substrate 2 whose surface is roughened including an edge portion thereof and parts of the foil-like aluminum substrates 3a to 3d whose surfaces are not roughened and which are connected to the foil-like aluminum substrate 2 whose surface is roughened.

On the whole surface of the foil-like aluminum substrate 2 whose surface is roughened and which is formed with the aluminum oxide film on the surface thereof of the thus fabricated electrode body 120, a cathode electrode of conductive high molecular polymer or the like is formed by a well known process, thereby fabricating a solid electrolytic capacitor component.

Figure 12:
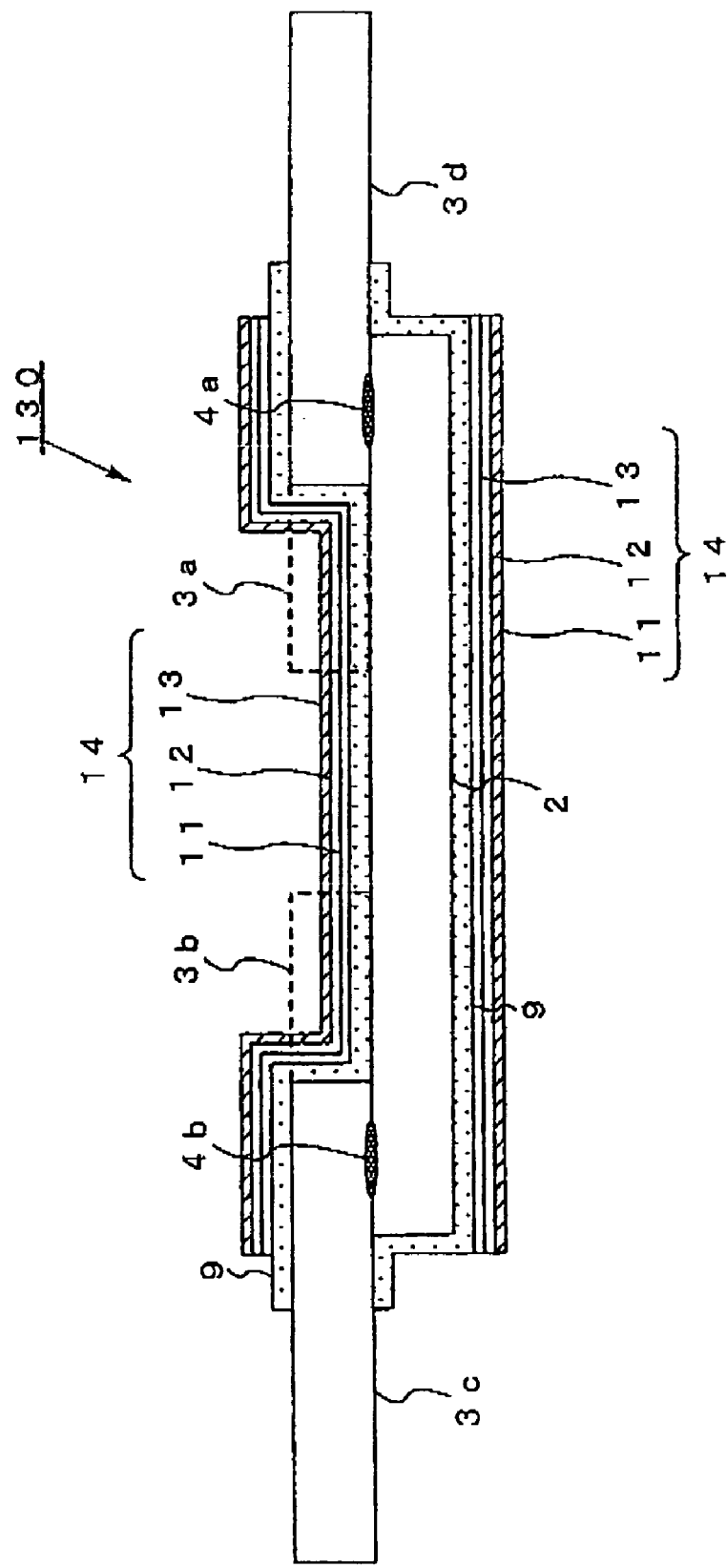
FIG. 12 is a schematic cross sectional view showing a solid electrolytic capacitor component.

FIG. 12 is a schematic cross sectional view showing a solid electrolytic capacitor component.

As shown in FIG. 12, the solid electrolytic capacitor component 130 includes a cathode electrode 14 formed by laminating a solid high molecular polymer electrolyte layer 11, a graphite paste layer 12 and a silver paste layer 13 on the substantially whole surface of the foil-like aluminum substrate 2 whose surface is roughened and which is formed with the aluminum oxide film 9.

The solid high molecular polymer electrolyte layer 11 containing conductive high molecular polymer is formed by chemical oxidation polymerization or electrolytic oxidation polymerization on the substantially whole surface of the foil-like aluminum substrate 2 whose surface is roughened and which is formed with the aluminum oxide film 9, and the graphite paste layer 12 and the silver paste layer 13 (conductive layers) are formed on the solid high molecular polymer electrolyte layer 11 by the screen printing method or the spray coating method.

The thus fabricated solid electrolytic capacitor component 130 is mounted on a lead frame after removing the mask of thermosetting resist 8x and the solid electrolytic capacitor component 10 is connected to an anode lead electrode and a cathode lead electrode formed in the lead frame in advance. Then, the solid electrolytic capacitor component 110 is molded, whereby a discrete type solid electrolytic capacitor is fabricated.

Figure 13:
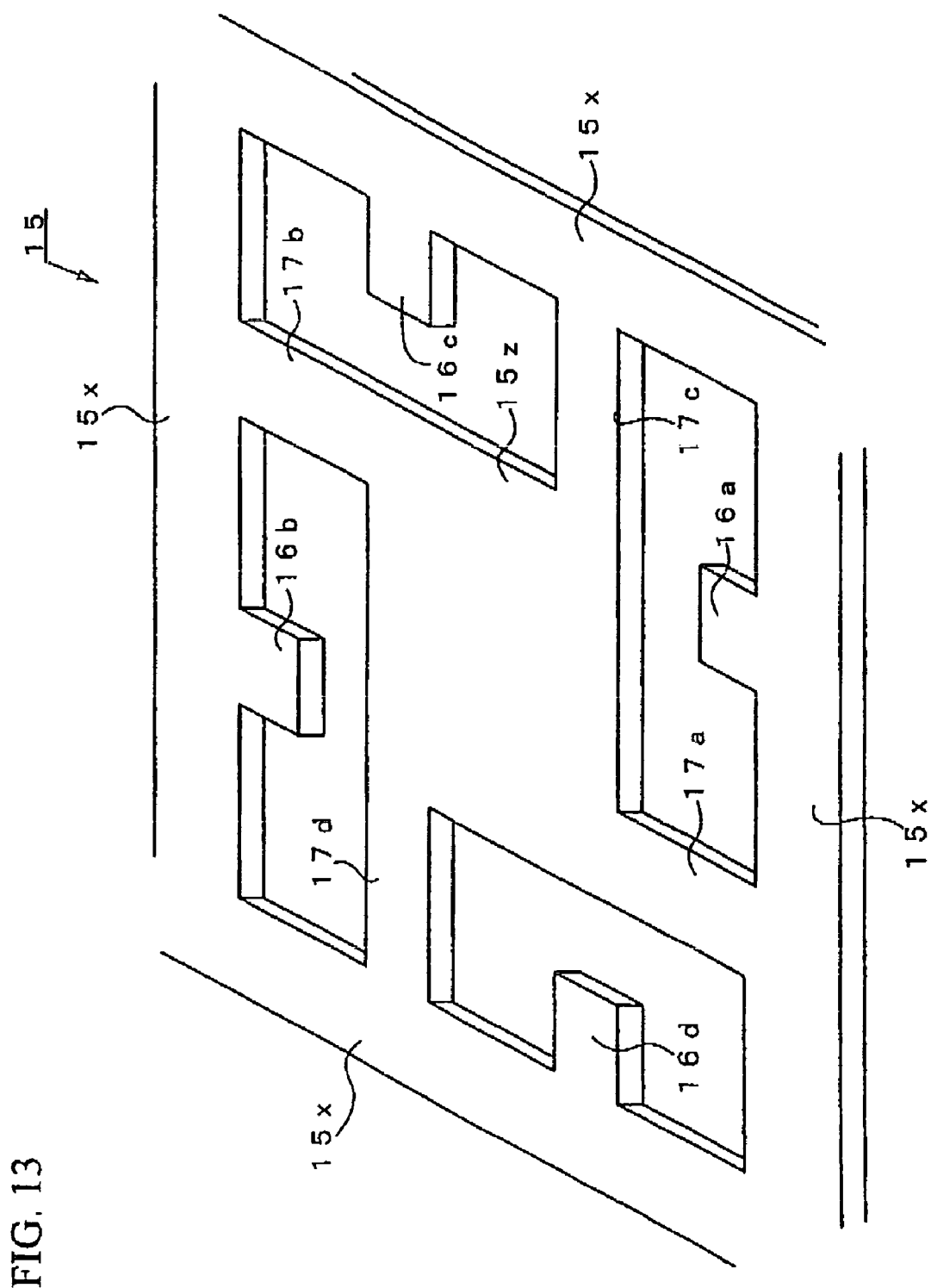
FIG. 13 is a schematic perspective view showing the structure of a lead frame.
Figure 14:
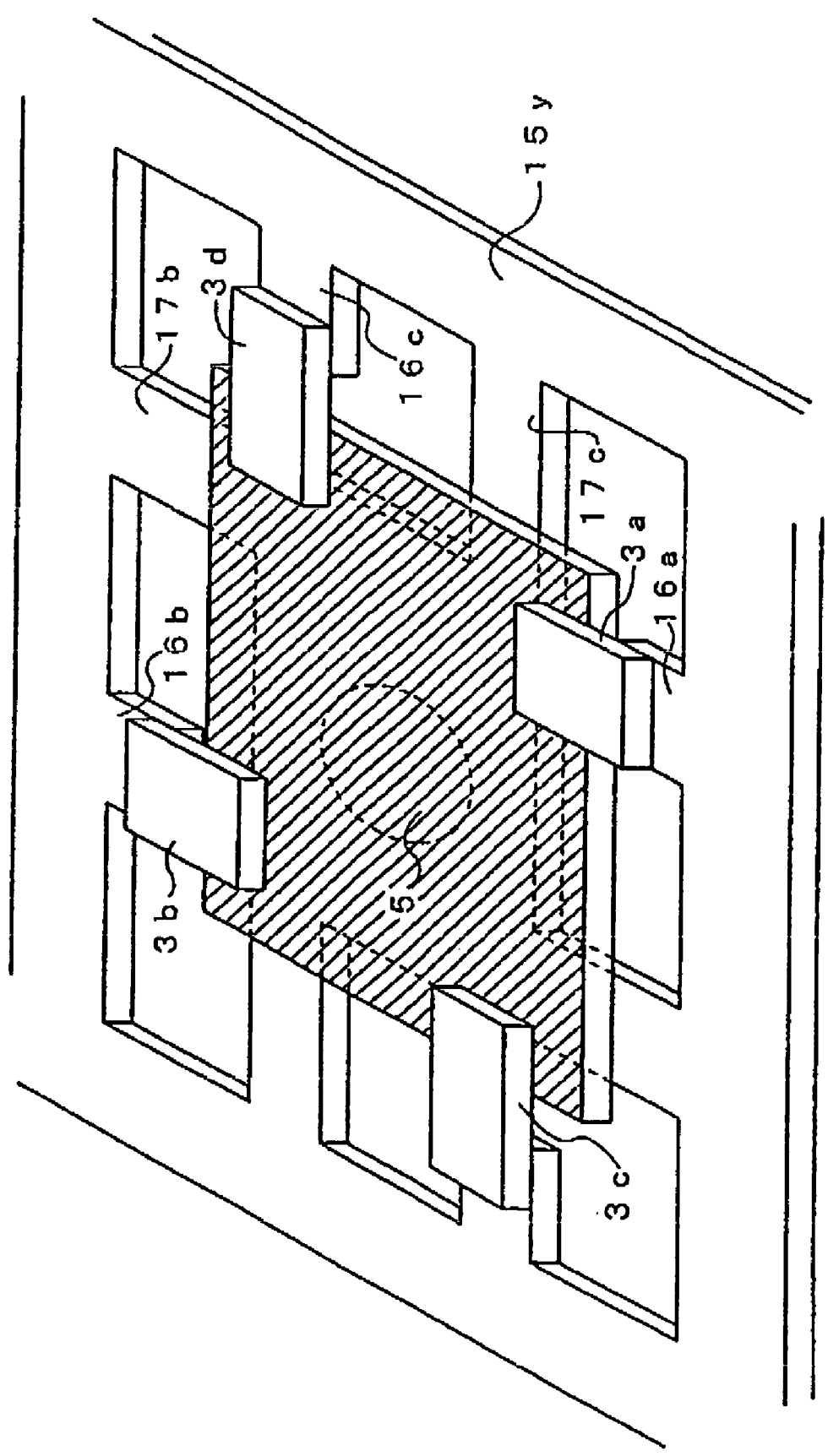
FIG. 14 is a schematic perspective view showing a solid electrolytic capacitor component 130 mounted on a lead frame.

FIG. 13 is a schematic perspective view showing the structure of a lead frame and FIG. 14 is a schematic perspective view showing solid electrolytic capacitor components 130 mounted on the lead frame.

As shown in FIGS. 13 and 14, the lead frame 15 is fabricated by punching out a phosphor bronze substrate so as to have a predetermined size for mounting the solid electrolytic capacitor component 130 thereon. A substantially rectangular island portion 15z is provided at the center portion of a main frame 15x located at the circumferential portion of the lead frame 15 and four anode lead electrode portions 16a to 16d projecting from the main frame 15x toward the island portion 15z are provided. Further, four cathode lead electrode portions 17a to 17d are provided so as to be spaced from the anode lead electrode portions 16a to 16d in parallel therewith and connect the main frame 15x and the island portion 15z.

The solid electrolytic capacitor component 130 is mounted on the island portion 15z of the lead frame 15 and fixed thereto by adhering the island portion 15z and the conductive layer 13 located on the lower surface of the solid electrolytic capacitor component 130 using a silver system conductive adhesive agent. End portion regions of the foil-like aluminum substrates 3a to 3d whose surfaces are not roughened are superposed on end portion regions of the four anode lead electrode portions 16a to 16d formed in the lead frame 15 in advance and welded using a laser spot welding machine to be connected to the anode lead electrode portions 16a to 16d.

Figure 15:
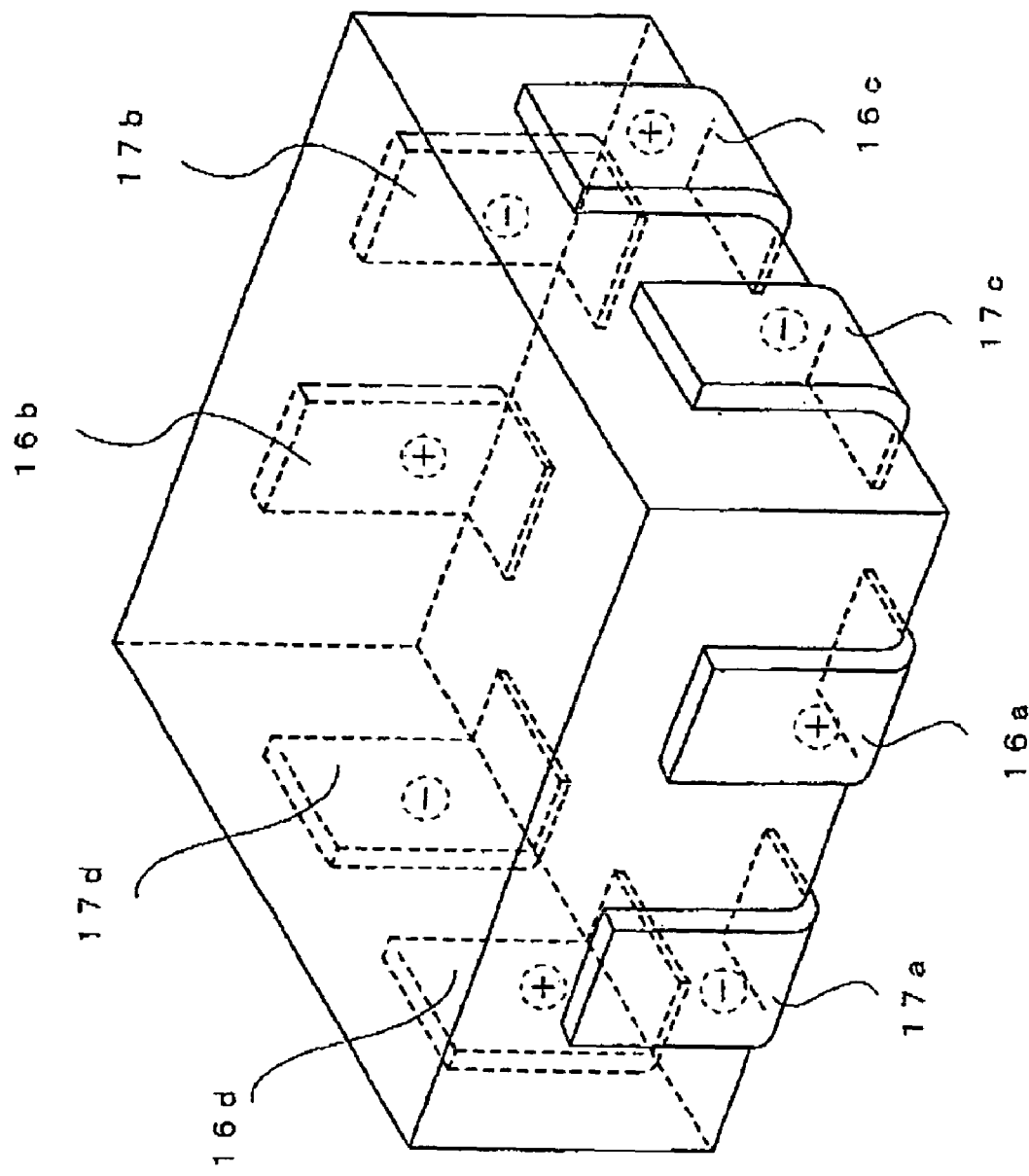
FIG. 15 is a schematic perspective view showing a discrete type solid electrolytic capacitor, wherein internal solid electrolytic capacitor components are not shown.

FIG. 15 is a schematic perspective view showing a discrete type solid electrolyte capacitor, wherein a solid electrolyte capacitor component disposed inside thereof is omitted.

As shown in FIG. 15, after the solid electrolytic capacitor component 130 has been fixed to the lead frame 15, it is molded with epoxy resin 19 by injection molding or transfer molding. The solid electrolytic capacitor component 130 molded with the epoxy resin 19 is removed from the lead frame and an anode lead electrode is formed by folding the anode lead electrode portions 16a to 16d. Further, a cathode lead electrode is formed by folding the cathode lead electrode portions 17a to 17d.

The thus fabricated solid electrolytic capacitor component 130 includes one of a lead electrode pair 18a including the anode lead electrode 16a and the cathode lead electrode 17a and a lead electrode pair 18c including the anode lead electrode 16c and the cathode lead electrode 17c on one edge portion region thereof and a lead electrode pair 18b including the anode lead electrode 16b and the cathode lead electrode 17b and a lead electrode pair 18d including the anode lead electrode 16d and the cathode lead electrode 17d at each of the four edge portion regions thereof. Since the anode lead electrodes and the cathode lead electrodes are disposed in this manner, magnetic fields generated by electrical currents flowing the anode lead electrodes and magnetic fields generated by electrical currents flowing the cathode lead electrodes can be canceled and, therefore, the ESL can be reduced.

As described above, according to this embodiment, since the one end portion region of each of the foil-like aluminum substrates 3a to 3d whose surfaces are not roughened is bonded to one of the four edge portion regions of the foil-like aluminum substrate 2 whose surface is roughened and which is formed with the aluminum oxide film on the surface thereof and the foil-like copper substrate 16a to 16d are bonded to the other edge portion region of the foil-like aluminum substrate 2, whereby the solid electrolytic capacitor component 130 is constituted, it is possible to fabricate a solid electrolytic capacitor component 130 having good electrical characteristics.

Further, according to this embodiment, since the solid electrolytic capacitor component 130 is constituted as a multi-terminal type solid electrolytic capacitor component, it is possible to deal with a large amount of ripple electrical current by dividing the electrical current path and obtain a solid electrolytic capacitor having good electric characteristics, i.e., whose initial characteristic values are good and do not vary substantially.

Furthermore, according to this embodiment, since at least one lead electrode pair is provided at one of the edge portions of the foil-like aluminum substrate 2 whose surface is roughened and which is formed with the aluminum oxide film on the surface thereof, high frequency electrical currents flow in the adjacent lead electrodes so that the polarities thereof are different from each other. Therefore, since magnetic fluxes generated in the adjacent lead electrodes are canceled, it is possible to reliably reduce the ESL.

Moreover, according to this embodiment, since the thus fabricated solid electrolytic capacitor component 130 has a foil-like shape, even if the solid electrolytic capacitor components are layered to fabricate a solid electrolyte capacitor, the thickness of the thus obtained solid electrolytic capacitor is very small and, therefore, it is possible to layer solid electrolytic capacitor components having the same electrode arrangement and fabricate a solid electrolyte capacitor having large electrostatic capacitance. Further, it is possible to provide a discrete type solid electrolytic capacitor by molding a solid electrolytic capacitor component with resin.

Figure 16:
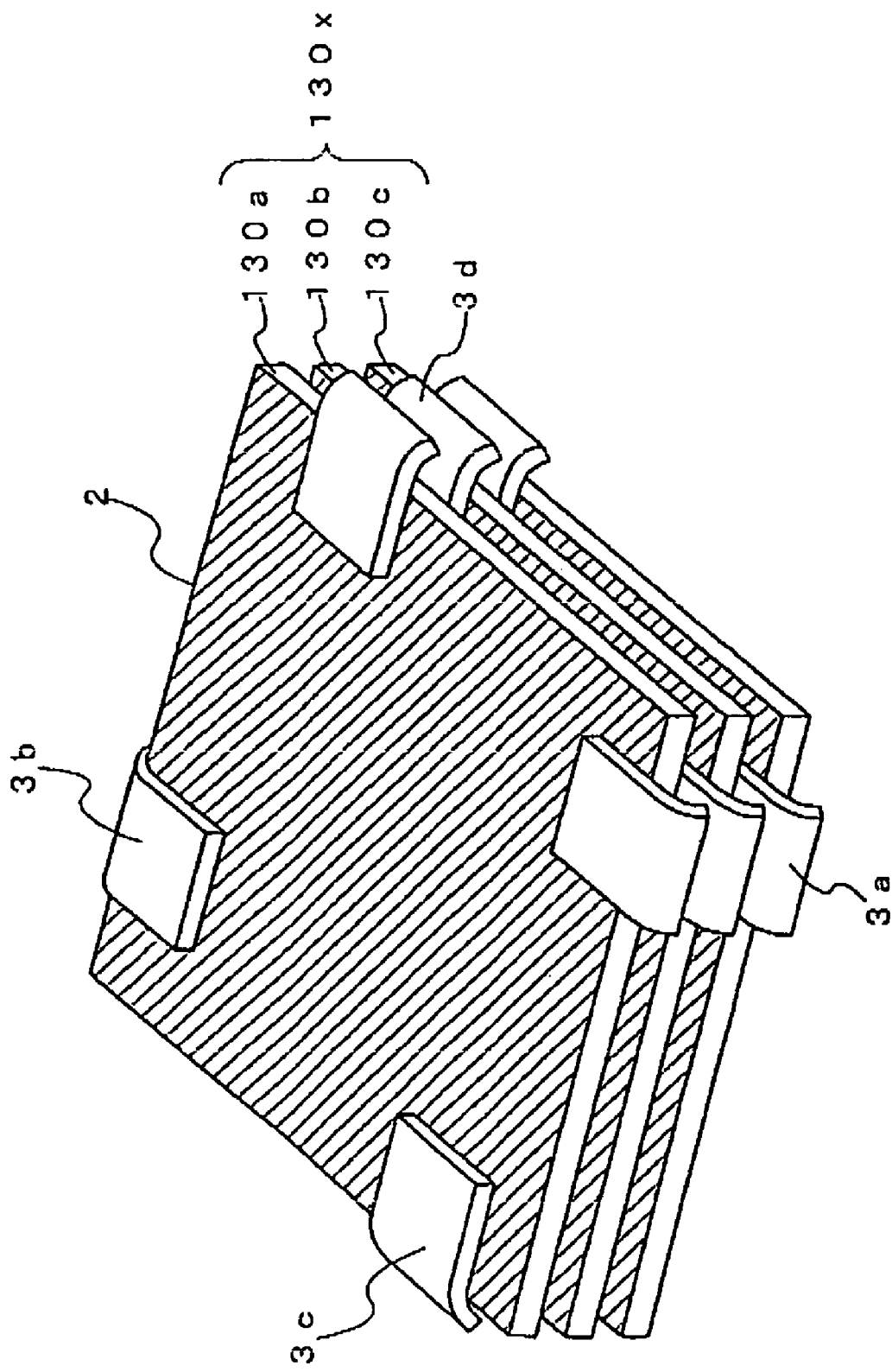
FIG. 16 is a schematic perspective view showing a multi-layered body of solid electrolytic capacitor components which is a further preferred embodiment of the present invention.

FIG. 16 is a schematic perspective view showing a multi-layered body of solid electrolytic capacitor components which is a further preferred embodiment of the present invention.

As shown in FIG. 16, the multi-layered body 10x of solid electrolytic capacitor components is constituted by layering three solid electrolytic capacitor components 10 shown in FIGS. 9 and 10.

The multi-layered body 10x of solid electrolytic capacitor components including the three solid electrolytic capacitor components 130a, 130b and 130c is fabricated by superposing the solid electrolytic capacitor components 130a, 130b and 130c in such a manner that the respective portions thereof are directed in the same direction and adhering them using a silver system conductive adhesive agent so that the conductive layers thereof are electrically connected. The lower surface of the foil-like aluminum substrate 2 whose surface is roughened and the upper surfaces of the foil-like aluminum substrates 3a to 3d whose surfaces are not roughened are fixed to each other by ultrasonic welding or crimping.

The thus constituted multi-layered body 10x of solid electrolytic capacitor components is mounted on the lead frame 15 similarly to the solid electrolytic capacitor component 130 and is fixed thereto by adhering the island portion 15z of the lead frame and the lowermost conductive layer of the multi-layered body 10x using a conductive adhesive agent and connecting it to the anode lead electrode portions 16a to 16d of the lead frame 15 by ultrasonic welding. Further, it is molded with resin, thereby fabricating a discrete type solid electrolyte capacitor.

As described above, according to this embodiment, since a solid electrolyte capacitor is constituted by the foil-like multi-layered body 110x of solid electrolytic capacitor components, it is possible to provide a solid electrolyte capacitor having a very small thickness and large electrostatic capacitance.

A further preferred embodiment of the present invention will be explained below.

Figure 17:
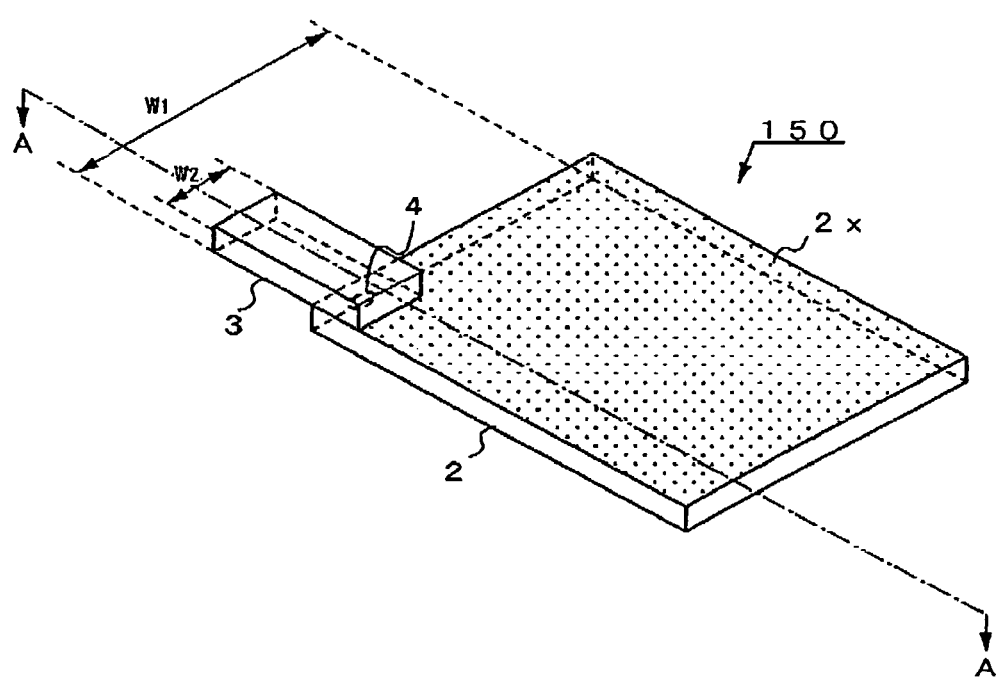
FIG. 17 is a schematic perspective view showing an electrode body for a solid electrolytic capacitor component (hereinafter sometimes simply referred to as an electrode) used for a solid electrolytic capacitor which is a still further preferred embodiment of the present invention.
Figure 18:
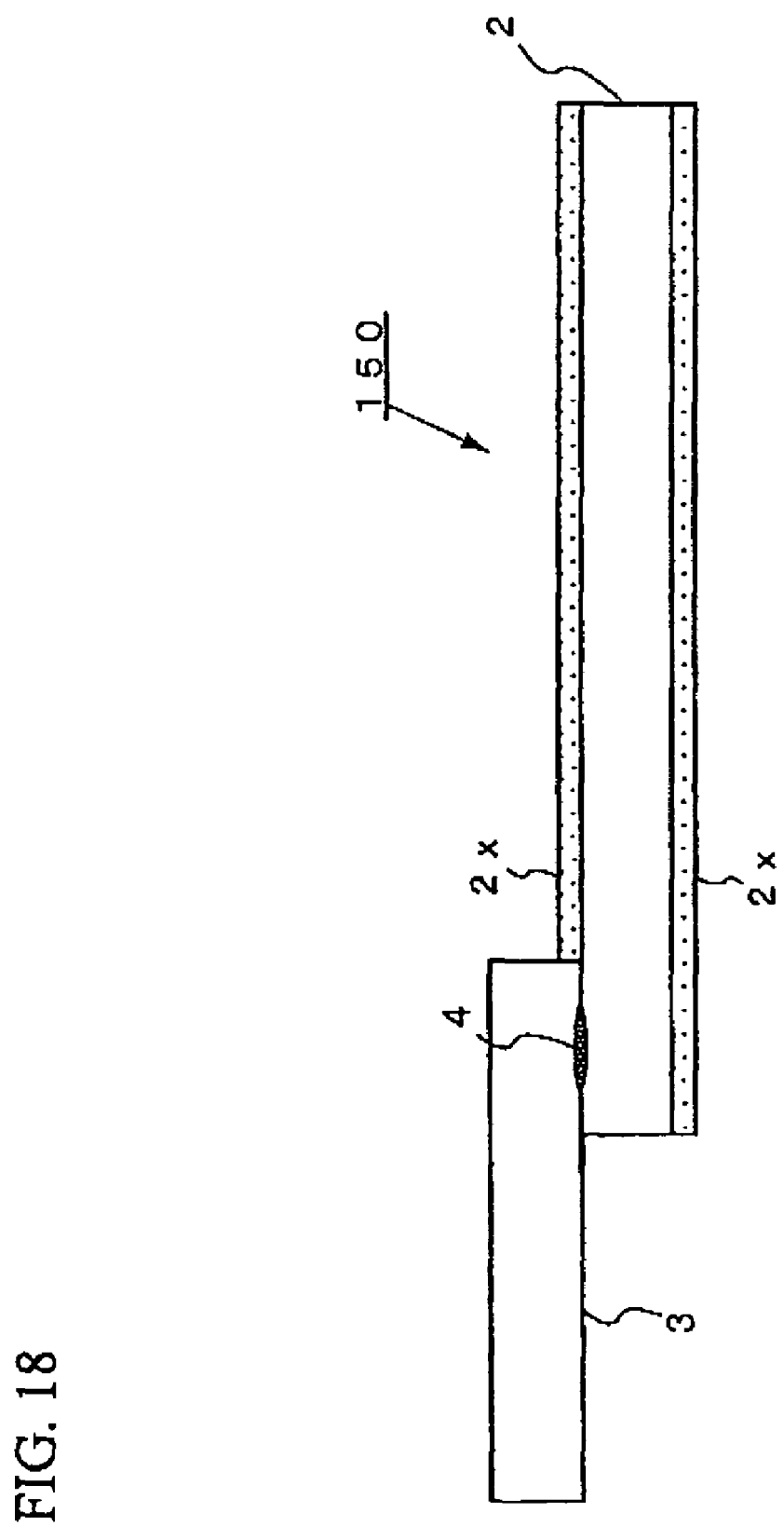
FIG. 18 is a schematic cross sectional view of an electrode body for a solid electrolytic capacitor component taken along a line A—A in FIG. 17.

FIG. 17 is a schematic perspective view showing an electrode body for a solid electrolytic capacitor component (hereinafter sometimes simply referred to as an electrode) used for a solid electrolytic capacitor which is a still further preferred embodiment of the present invention and FIG. 18 is a schematic cross sectional view of an electrode body for a solid electrolytic capacitor component taken along a line A—A in FIG. 17.

In this embodiment, aluminum is used as a valve metal capable of forming an insulating oxide film and as shown in FIGS. 17 and 18, an electrode body 150 of the solid electrolytic capacitor according to this embodiment includes a foil-like aluminum substrate 2 whose surface is roughened or enlarged and which is formed with an aluminum oxide film 2x on the surface thereof as an insulating oxide film and a foil-like aluminum substrate 3 whose surface is not roughened.

One end portion region of the foil-like aluminum substrate 3 whose surface is not roughened is bonded to one end portion of the foil-like aluminum substrate 2 whose surface is roughened and which is formed with an aluminum oxide film 2x on the surface thereof by ultrasonic welding so that electrical connection can be established between the valve metals. The width of the foil-like aluminum substrate 3 whose surface is not roughened is determined smaller than that of the foil-like aluminum substrate 2 whose surface is roughened and the foil-like aluminum substrate 3 is provided at one corner of the foil-like aluminum substrate 2.

When the electrode body 150 is to be formed, the foil-like aluminum substrate 2 is first cut so as to have a predetermined size from an aluminum foil sheet whose surface is roughened and which is formed with an aluminum oxide film on the surface thereof and foil-like aluminum substrate 3 is further cut so as to have a predetermined size from an aluminum foil sheet whose surface is not roughened. At this time, it is preferable to properly determine the width $w_2$ of the foil-like aluminum substrate 3 so as to be smaller than a half of the width $w_1$ of the foil-like aluminum substrate 2.

Then, one end portion region of each the foil-like aluminum substrate 3 whose surface is not roughened is superposed on at a position close to the corner of the foil-like aluminum substrate 2 at one end portion region thereof in such a manner that end portion regions thereof having predetermined areas are overlapped. Here, the areas of the end portion region of the foil-like aluminum substrate 3 whose surface is not roughened and the end portion region of the foil-like aluminum substrate 2 to be superposed are determined so that the connected portion can have a predetermined strength.

The end portion region of the foil-like aluminum substrate 2 whose surface is roughened and the end portion region of the foil-like aluminum substrate 3 whose surface is not roughened superposed in this manner are connected to each other by ultrasonic welding, thereby forming a welding connected portion 4. Here, the aluminum oxide film 2x is removed by connecting the end portion region of the foil-like aluminum substrate 3 whose surface is not roughened and the end portion region of the foil-like aluminum substrate 2 whose surface is roughened by ultrasonic welding, whereby the end portion regions of the foil-like aluminum substrate 2 whose surface is roughened and the end portion region of the foil-like aluminum substrate 3 whose surface is not roughened are connected to each other so that electrical connection can be established between aluminum metals.

Since the foil-like aluminum substrate 2 whose surface is roughened and which is formed with the aluminum oxide film 2x on the surface thereof is cut from an aluminum foil sheet, no aluminum oxide film is formed on an edge portion thereof and, therefore, it is required to form an aluminum oxide film on an edge portion of the foil-like aluminum substrate 2 whose surface is roughened by anodic oxidation in order to use the thus formed electrode body 150 as an anodic electrode of a solid electrolytic capacitor.

Figure 19:
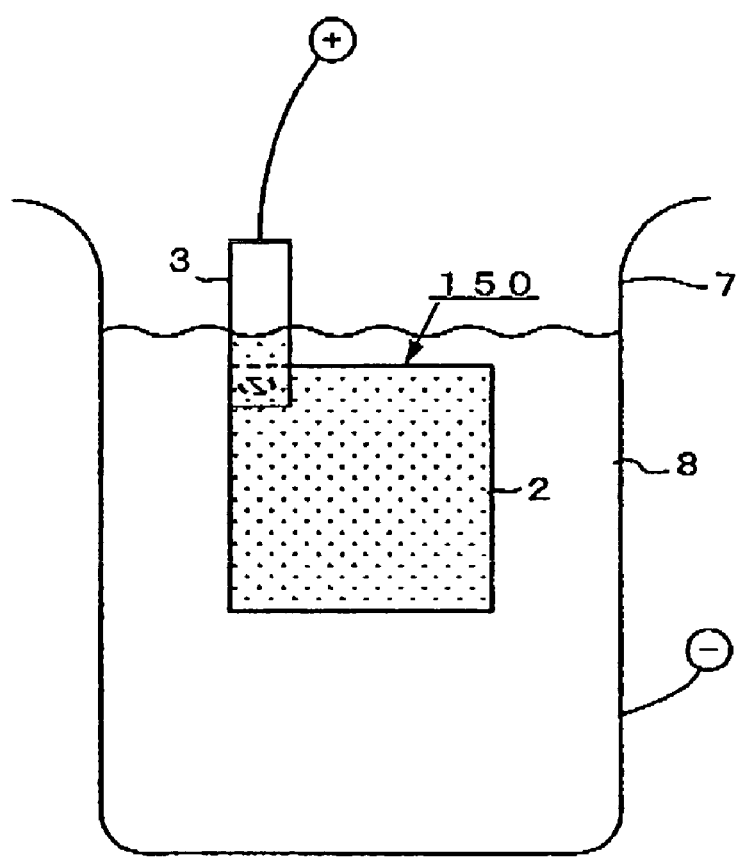
FIG. 19 is a schematic cross sectional view showing an anodic oxidization method for forming an aluminum oxide film on an edge portion of a foil-like aluminum substrate 2 whose surface is roughened.

FIG. 19 is a schematic cross sectional view showing an anodic oxidation method for forming an aluminum oxide film on an edge portion of the foil-like aluminum substrate 2 whose surface is roughened.

As shown in FIG. 19, the electrode body 150 is set in a forming solution 8 consisting of an ammonium adipate solution accommodated in a beaker 7 made of stainless steel in such a manner that the whole foil-like aluminum substrate 2 whose surface is roughened and a part of the foil-like aluminum substrate 3 whose surface is not roughened in the forming solution 8 and voltage is applied with the foil-like aluminum substrate 3 whose surface is not roughened to the plus side and the beaker 7 made of stainless steel connected to the minus side.

The applied voltage can be determined in accordance with the thickness of the aluminum oxide film to be formed and when an aluminum oxide film having a thickness of 10 nm to 1 μm is to be formed, the applied voltage is normally determined to be several volts to about twenty volts.

As a result, anodic oxidation is started. Although the forming solution 8 moves upward due to the capillary phenomenon during the anodic oxidation operation since the surface of the foil-like aluminum substrate 2 is roughened, it does not move upward to the foil-like aluminum substrate 3 beyond the connected portion of the foil-like aluminum substrate 2 whose surface is roughened and the foil-like aluminum substrate 3 whose surface is not roughened since the surface of the foil-like aluminum substrate 3 is not roughened.

Therefore, an aluminum oxide film is formed on only a region which includes the whole surface of the foil-like aluminum substrate 2 whose surface is roughened including an edge portion thereof and a part of the foil-like aluminum substrate 3 whose surface is not roughened and which is connected to the foil-like aluminum substrate 2 whose surface is roughened.

On the whole surface of the foil-like aluminum substrate 2 whose surface is roughened and which is formed with the aluminum oxide film on the surface thereof of the thus fabricated electrode body 150, a cathode electrode of conductive high molecular polymer or the like is formed by a well known process, thereby fabricating a solid electrolytic capacitor component.

Figure 20:
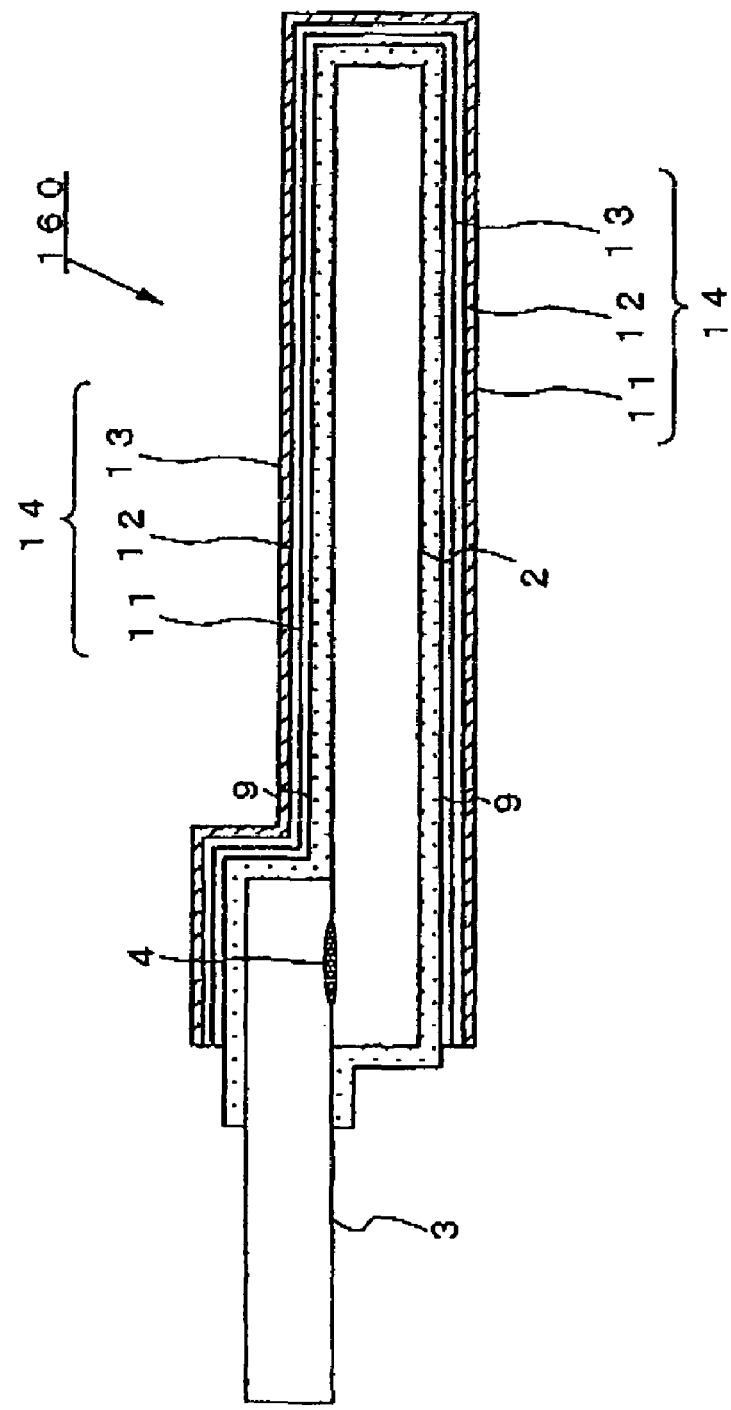
FIG. 20 is a schematic cross sectional view showing a solid electrolytic capacitor component.

FIG. 20 is a schematic cross sectional view showing a solid electrolytic capacitor component.

As shown in FIG. 20, the solid electrolytic capacitor component 160 includes a cathode electrode 14 formed by laminating a solid high molecular polymer electrolyte layer 11, a graphite paste layer 12 and a silver paste layer 13 on the substantially whole surface of the foil-like aluminum substrate 2 whose surface is roughened and which is formed with the aluminum oxide film 9.

The solid high molecular polymer electrolyte layer 11 containing conductive high molecular polymer is formed by chemical oxidation polymerization or electrolytic oxidation polymerization on the substantially whole surface of the foil-like aluminum substrate 2 whose surface is roughened and which is formed with the aluminum oxide film 9, and the graphite paste layer 12 and the silver paste layer 13 (conductive layers) are formed on the solid high molecular polymer electrolyte layer 11 by the screen printing method or the spray coating method.

In this manner, a total of two solid electrolytic capacitor components 160 are prepared and cathode electrodes 14 thereof are partly overlapped, thereby fabricating a multi-layered body of the solid electrolytic capacitor components.

Figure 21:
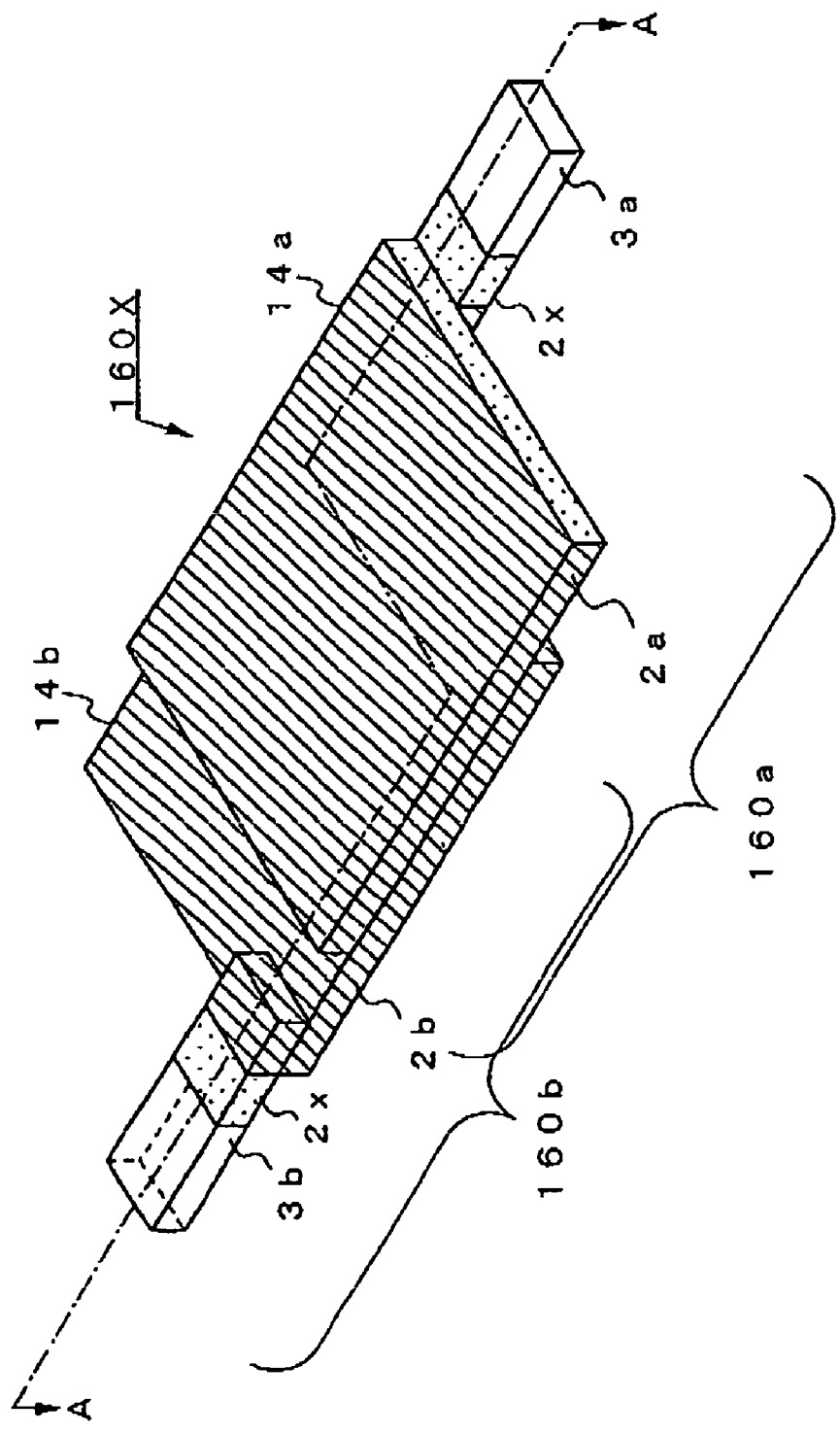
FIG. 21 is a schematic perspective view showing a multi-layered body of solid electrolytic capacitor components.
Figure 22:
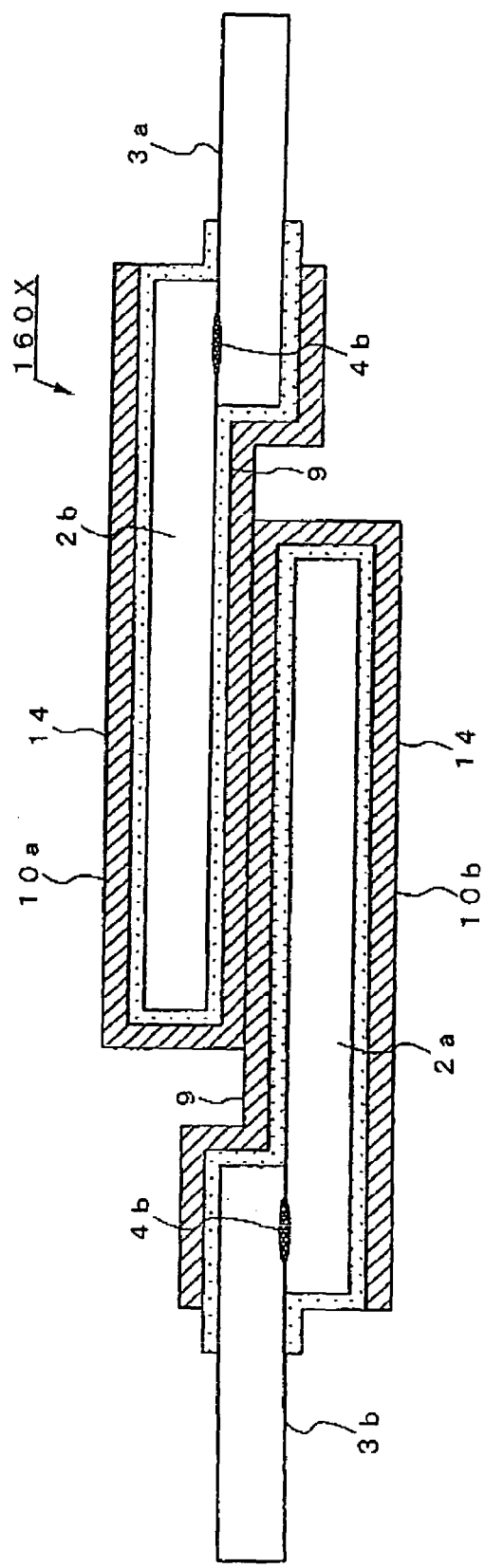
FIG. 22 is a schematic cross sectional view of a multi-layered body of solid electrolytic capacitor components taken along a line A—A in FIG. 21.

FIG. 21 is a schematic perspective view showing a multi-layered body of solid electrolytic capacitor components and FIG. 22 is a schematic cross sectional view of a multi-layered body of solid electrolytic capacitor components taken along a line A—A in FIG. 21.

As shown in FIGS. 21 and 22, the multi-layered body 160x of the solid electrolytic capacitor components includes two solid electrolytic capacitor components 160a and 160b each corresponding to the multi-layered body 160 of the solid electrolytic capacitor components shown in FIG. 20. More specifically, the solid electrolytic capacitor component 160a includes a foil-like aluminum substrate 2a whose surface is roughened and which is formed with an aluminum oxide film on the surface thereof and a foil-like aluminum substrate 3a whose surface is not roughened, and a cathode electrode 14a including a solid high molecular polymer electrolyte layer 11, a graphite paste layer 12 and a silver paste layer 13 is formed on the surface of the foil-like aluminum substrate 2a. Further, the solid electrolytic capacitor component 160b includes a foil-like aluminum substrate 2b whose surface is roughened and which is formed with an aluminum oxide film on the surface thereof and a foil-like aluminum substrate 3b whose surface is not roughened, and a cathode electrode 14b is formed on the foil-like aluminum substrate 2b.

The solid electrolytic capacitor component 160a and the solid electrolytic capacitor component 160b are disposed so as to be offset from each other by 180 degrees in such a manner that the foil-like aluminum substrates 2a and 2b on which the cathode electrodes are formed face each other and that the foil-like aluminum substrates 3a and 3b are located on the outer sides. Then, end portion regions of the foil-like aluminum substrates 2a and 2b are superposed in such a manner that the cathode electrodes can be electrically connected to each other and adhered to each other using a silver system conductive adhesive agent.

The thus constituted multi-layered body 160x of solid electrolytic capacitor components is mounted on the lead frame 15 and after an anode lead electrode and a cathode lead electrode have been attached thereto, it is molded, thereby fabricating a discrete type solid electrolyte capacitor.

Figure 23:
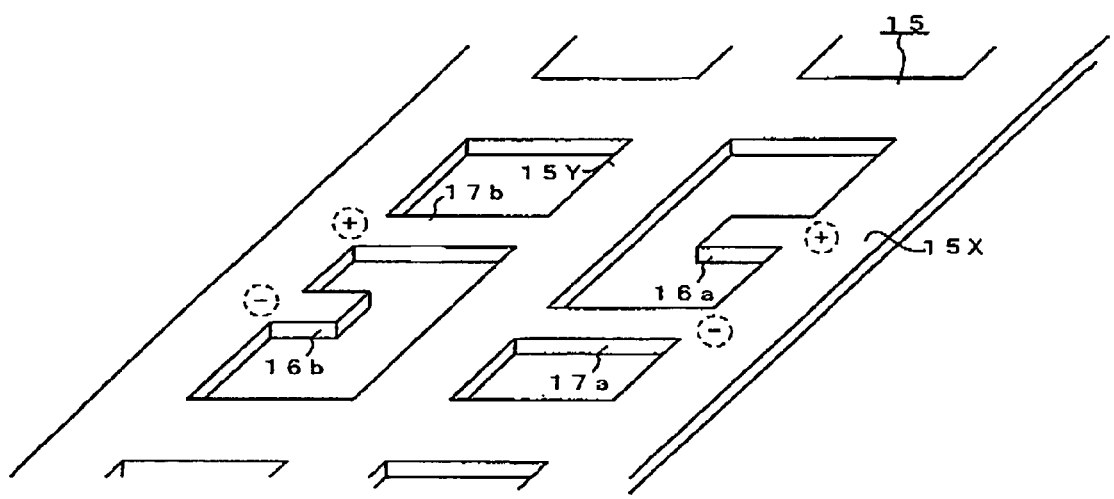
FIG. 23 is a schematic perspective view showing the structure of a lead frame.
Figure 24:
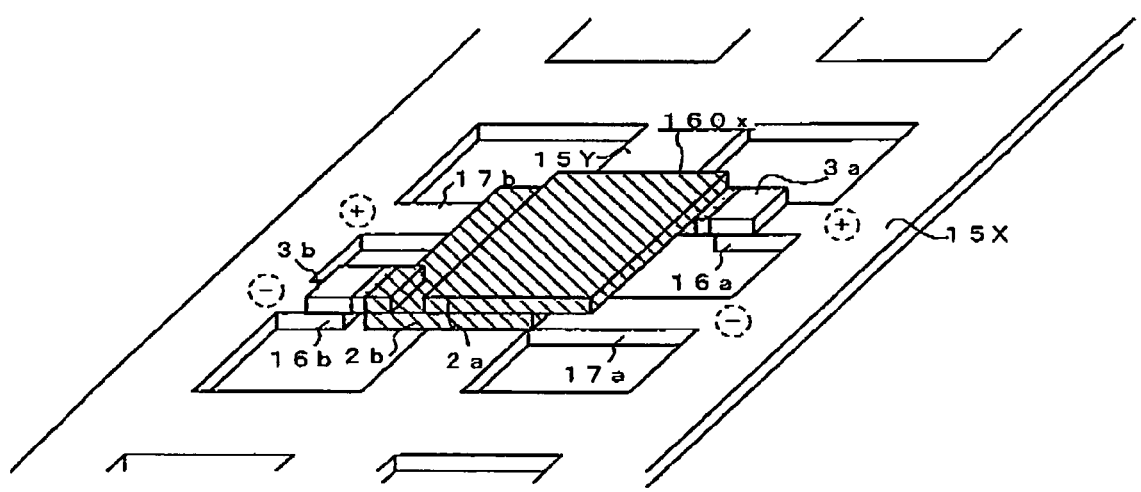
FIG. 24 is a schematic perspective view showing a multi-layered body of solid electrolytic capacitor components mounted on a lead frame.

FIG. 23 is a schematic perspective view showing the structure of a lead frame and FIG. 24 is a schematic perspective view showing the multi-layered body 160x of solid electrolytic capacitor components mounted on the lead frame.

As shown in FIGS. 23 and 24, the lead frame 15 is fabricated by punching out a phosphor bronze substrate so as to have a predetermined size for mounting the multi-layered body 160x of the solid electrolytic capacitor component thereon. A band-like island portion 15Y is provided at the center portion of a main frame 15x located at the circumferential portion of the lead frame 15 and four anode lead electrode portions 16a and 16b projecting from the main frame 15X toward the island portion 15Y are provided in a direction perpendicular to the island portion 15Y. Further, four cathode lead electrode portions 17a and 17b are provided so as to be spaced from the anode lead electrode portions 16a and 16b in parallel therewith and connect the main frame 15X and the island portion 15Y.

The multi-layered body 160X of the solid electrolytic capacitor component is mounted on the island portion 15y of the lead frame 15 and fixed thereto by adhering the island portion 15y and a conductive layer portion serving as a cathode electrode using a silver system conductive adhesive agent. End portion regions of the foil-like aluminum substrates 3a and 3b whose surfaces are not roughened are superposed on end portion regions of the anode lead electrode portions 16a and 16b formed in the lead frame 15 in advance and welded using a laser spot welding machine to be connected to the anode lead electrode portions 16a and 16b.

Further, after the solid electrolytic capacitor components have been fixed to the lead frame 15, they are molded with epoxy resin by injection molding or transfer molding.

Figure 25:
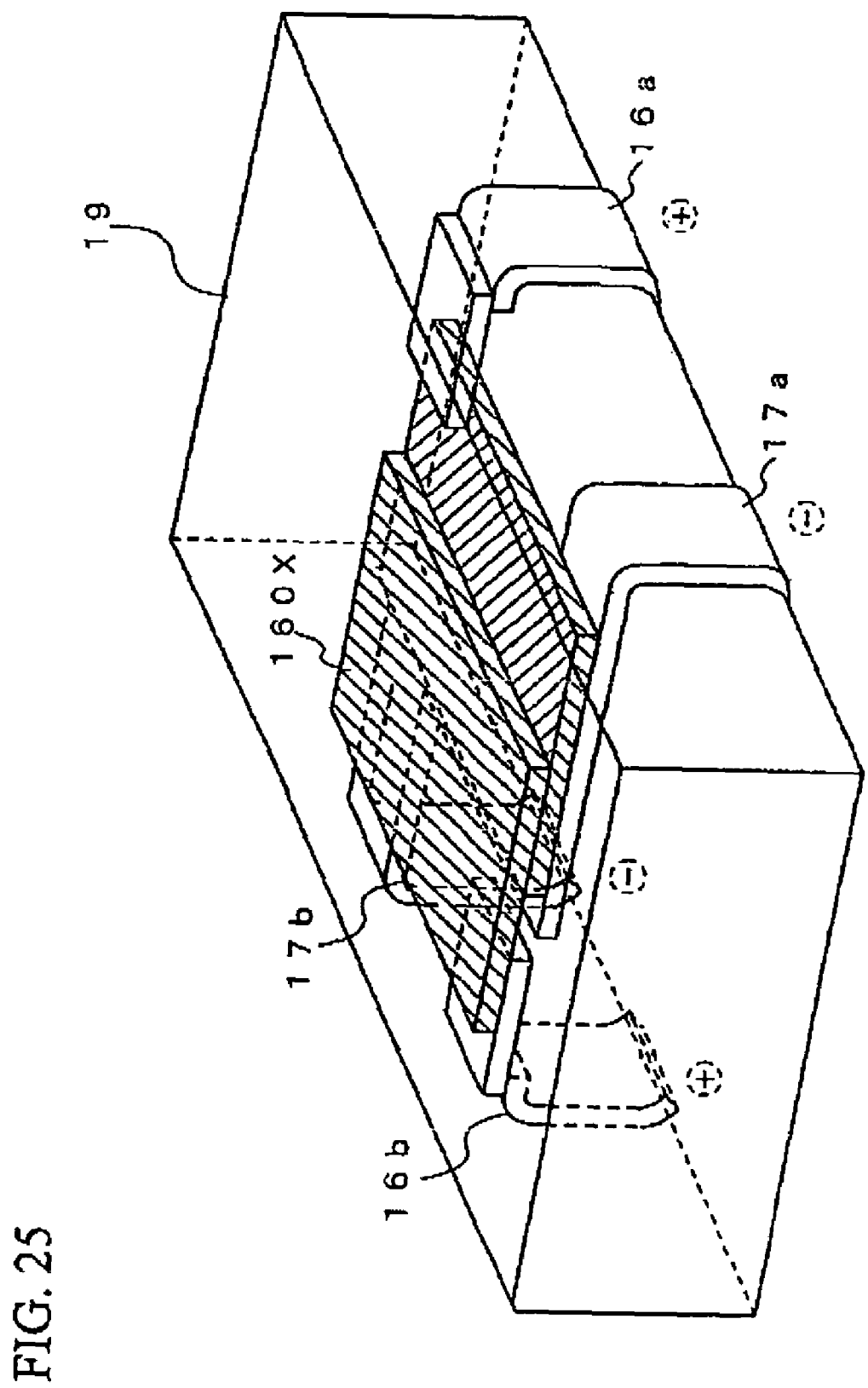
FIG. 25 is a schematic perspective view showing a discrete type solid electrolytic capacitor.

FIG. 25 is a schematic perspective view showing a discrete type solid electrolyte capacitor.

The multi-layered body 160X of the solid electrolytic capacitor components molded with the epoxy resin is removed from the lead frame and an anode lead electrode is formed by folding the anode lead electrode portions 16a and 16b. Further, a cathode lead electrode is formed by folding the cathode lead electrode portions 17a and 17b.

As described above, according to this embodiment, since the one end portion region of the foil-like aluminum substrate whose surface is not roughened is bonded to the one end portion region of the foil-like aluminum substrate whose surface is roughened and which is formed with the aluminum oxide film on the surface thereof and the anode lead electrodes each consisting of the foil-like copper substrate are bonded to the other edge portion region of the foil-like aluminum substrate, whereby the solid electrolytic capacitor component is constituted, it is possible to fabricate a solid electrolytic capacitor component having good electrical characteristics.

Further, according to this embodiment, since a solid electrolytic capacitor is constituted as a pseudo three-terminal type solid electrolytic capacitor, it is possible to reduce the ESL by dividing an electrical current path and obtain a solid electrolytic capacitor having good electric characteristics, i.e., whose initial characteristic values are good and do not vary substantially.

Furthermore, in the above constituted multi-layered body of the solid electrolytic capacitor components, since the cathode lead electrode 17a is drawn out in parallel with the anode lead electrode 16a, a magnetic field generated by an electrical current flowing in the anode lead electrode and a magnetic field generated by an electrical current flowing in the cathode lead electrode can be canceled, whereby it is possible to further reduce the ESL. The same advantage can be obtained in a lead electrode pair consisting of the anode lead electrode 16b and the cathode lead electrode 17b.

Moreover, according to this embodiment, since the lead electrode pairs of the solid electrolytic capacitor components each consisting of the anode lead electrode and the cathode lead electrode are disposed at positions symmetric with respect to each other around the center of gravity of the multi-layered body of the solid electrolytic capacitor components and facing each other, it is possible to mount the solid electrolytic capacitor on a circuit board without pay attention to the direction of the solid electrolytic capacitor and prevent the solid electrolytic capacitor from being erroneously mounted thereon.

Figure 26:
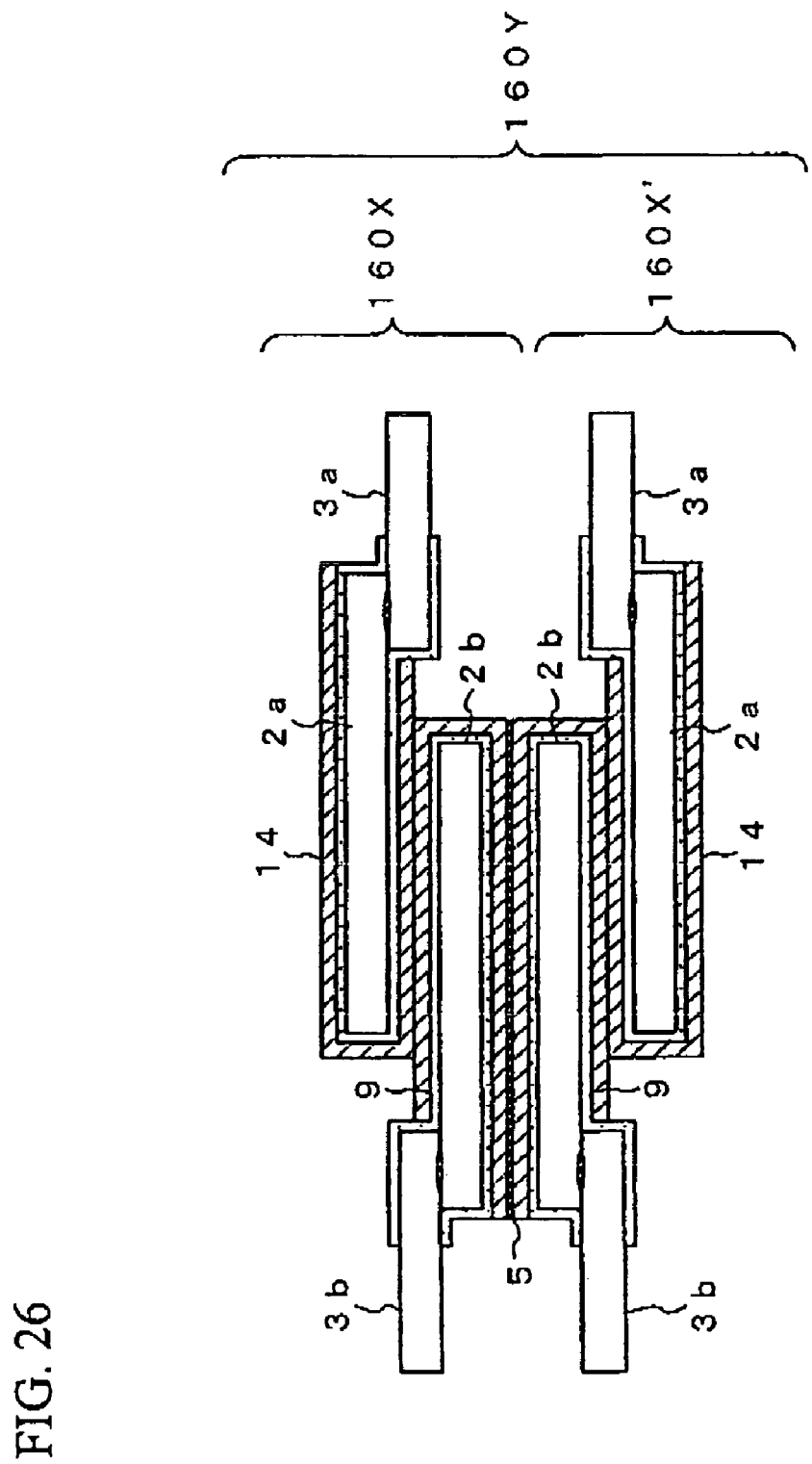
FIG. 26 is a schematic perspective view showing a solid electrolytic capacitor component unit which is a further preferred embodiment of the present invention.

FIG. 26 is a schematic perspective view showing a solid electrolytic capacitor component unit which is a further preferred embodiment of the present invention.

As shown in FIG. 26, the solid electrolytic capacitor component unit 10Y is constituted by further layering the multi-layered bodies 10X shown in FIGS. 21 and 22.

The foil-like aluminum substrates 2a of two solid electrolytic capacitor components 10X, 10X' are superposed so that cathode electrodes are electrically connected and adhered to each other using a silver system conductive adhesive agent. The foil-like aluminum substrates 3a and 3b whose surfaces are not roughened are not connected.

The thus constituted solid electrolytic capacitor component unit 10Y is mounted on the lead frame similarly to the multi-layered body 10X of the solid electrolytic capacitor components and a support portion 15y connecting the cathode lead electrode portions 17a and 17b of the lead frame shown in FIG. 23 and the cathode electrode 14b of one of the solid electrolytic capacitor components 10X and 10X' are adhered by a conductive adhesive agent 5. Each of the foil-like aluminum substrates 3a and 3b of the solid electrolytic capacitor components 10X and 10X' are integrated with the anode lead electrode portions 16a and 16b of the lead frame using a spot welding machine or the like. Thereafter, the solid electrolytic capacitor component unit 10Y is molded with resin, thereby fabricating a discrete-type solid electrolytic capacitor. Therefore, it is possible to further increase electrostatic capacitance of a solid electrolytic capacitor.

Hereinafter, working examples and comparative examples will be set out in order to further clarify the advantages of the present invention.

WORKING EXAMPLE 1

A solid electrolytic capacitor according to a first embodiment was prepared in the following manner.

An aluminum foil was first cut from the sheet of an aluminum foil having a thickness of 100 μm whose surface was roughened and which was formed with an aluminum oxide film on the surface thereof so as to have a size of 0.75 cm$^2$. Further, four aluminum foils were cut from the sheet of an aluminum foil having a thickness of 70 μm whose surface was not roughened so as to have a width equal to or smaller than a quarter of the width of the aluminum foil whose surface was roughened. These four aluminum foils were disposed on opposite end portion regions of the aluminum foil whose surface was roughened so that two of them were disposed to be spaced from each other on one of the opposite end portion regions of the aluminum foil whose surface was roughened and they were superposed on the opposite end portion regions of the aluminum foil whose surface was roughened so that end portion regions thereof were overlapped by 0.5 mm. Next, the end portion regions overlapped with each other were bonded and electrically connected using a "40 kHz-Ultrasonic Welding Machine" manufactured by Branson Ultrasonics Division of Emerson Japan Limited, thereby forming a connected body of the aluminum foils whose surfaces were not roughened and the aluminum foil whose surface was roughened.

Thus, an electrode body for a solid electrolytic capacitor component in which the four aluminum foils whose surface was not roughened were bonded to the aluminum foil whose surface was roughened was fabricated.

Among the four aluminum foils whose surfaces were not roughened formed on opposite end portion regions of the aluminum foil whose surface was roughened in the thus fabricated electrode body, only parts other than the connected portions of the two aluminum foils each formed on the one end portion region of the aluminum foil whose surface was roughened were coated with resist.

Further, the thus fabricated electrode body was set in an aqueous solution of ammonium adipate prepared to have a concentration of 3% by weight, pH 6.0 so that the whole aluminum foil which was formed with an aluminum oxide film on the surface thereof and whose surface was roughened was completely immersed therein. At this time, among the four aluminum foils whose surfaces were not roughened, the two aluminum foils coated with resist were immersed in the aqueous solution of ammonium adipate and a part of the two aluminum foils which were not coated with resist, namely, portions thereof superposed on the aluminum foil whose surface was roughened and welded thereon were immersed in the aqueous solution of ammonium adipate.

An aluminum oxide film was then formed by connecting the aluminum foil which was not coated with resist and whose surface was not roughened to an anode, oxidizing the cut side surfaces of the aluminum foils immersed in the aqueous solution of ammonium adipate under the condition that a forming current density was set at 50 to 100 mA/cm$^2$ and a forming voltage was set equal to or lower than 12 volts.

Thereafter, the electrode body was extracted from the aqueous solution of ammonium adipate and a solid high molecular polymer electrolyte layer containing polypyrrol was formed by chemical oxidization polymerization on the surface of the aluminum foil of the anodic electrode which was roughened.

More specifically, the electrode body was set in a cell of a mixing solution of ethanol and water containing 0.1 mol/liter of pyrrol monomer purified by distillation, 0.1 mol/liter of alkylnaphthalene sodium sulfonate and 0.05 mol/liter of ferrous sulphate (III) so that only the aluminum foil whose surface was roughened and which is formed of the aluminum oxide film was immersed therein and the solution was agitated for thirty minutes, thereby performing chemical oxidization polymerization. The same operation was repeated three times, thereby forming a solid high molecular polymer electrolyte layer containing polypyrrol. As a result, a solid high molecular polymer electrolyte layer having a thickness of about 50 μm was formed.

Carbon paste was coated on the surface of the thus obtained solid high molecular polymer electrolyte layer and silver paste was further coated on the carbon paste, thereby forming a cathode electrode. After the paste layers were formed, the resist layer was dissolved with an organic solvent, thereby removing the resist layer and the two aluminum foils whose surfaces were not roughened were exposed. Thus, a solid electrolytic capacitor component was fabricated.

Further, a total of three solid electrolytic capacitor components were prepared by repeating the above steps.

As shown in FIG. 8, the three solid electrolytic capacitor components were layered in such a manner that corresponding portions thereof were directed in the same directions and were integrated with each other by adhering the paste layers thereof using a conductive adhesive agent.

Thus, a multi-layered body of the solid electrolytic capacitor components in which the three solid electrolytic capacitor components were integrated with each other was fabricated.

The thus fabricated multi-layered body of the solid electrolytic capacitor components was mounted on a lead frame processed so as to have a predetermined shape as shown in FIG. 5. A portion of the conductive layer (paste layer) exposed from the lowermost surface of the multi-layered body was bonded onto the lead frame using a silver system conductive adhesive agent. One end portion region of each of the aluminum foils whose surfaces were not roughened was welded using a "YAG Laser Spot Welding Machine" manufactured by NEC Corporation and integrated with an anode lead portion of the lead frame.

After multi-layered body of the solid electrolytic capacitor components was fixed onto the lead frame, it was molded with epoxy resin using an injection molding or a transfer molding.

The thus molded multi-layered body of the solid electrolytic capacitor component was removed from the lead frame and the anode lead electrodes were folded, thereby fabricating a discrete type and eight-terminal type solid electrolytic capacitor sample #1 shown in FIG. 8. Then, a predetermined voltage current was supplied to the solid electrolytic capacitor sample #1 by a well known method, thereby conducting aging and sufficiently lowering a leak electrical current. Thus, the solid electrolytic capacitor sample #1 was completed.

Electrostatic capacitance and the $S_{21}$ characteristic of the thus fabricated eight-terminal type solid electrolytic capacitor sample #1 were measured using an "Impedance Analyzer 4294A" and a "Net Work Analyzer 8753D" manufactured by Agilient Technologies. Then, equivalent circuit simulation was performed based on the thus measured $S_{21}$ characteristic, thereby determining an ESR value and an ESL value.

As a result, the electrostatic capacitance of the solid electrolytic capacitor sample #1 at 120 Hz was 115.0 μF, the ESR value thereof at 100 kHz was 14 mΩ and the ESL value thereof at 100 kHz was 200 pH.

WORKING EXAMPLE 2

A solid electrolytic capacitor according to a second embodiment was prepared in the following manner.

A quadrate aluminum foil was first cut from the sheet of an aluminum foil having a thickness of 100 μm whose surface was roughened and which was formed with an aluminum oxide film on the surface thereof so as to have a size of 1 cm$^2$. Further, four aluminum foils were cut from the sheet of an aluminum foil having a thickness of 70 μm whose surface was not roughened so as to have a width equal to or smaller than a half of the width of the aluminum foil whose surface was roughened. Each of these four aluminum foils were disposed on one of four end portion regions of the aluminum foil whose surface was roughened so as to be close to the corner of the aluminum foil whose surface was roughened and they were superposed on the end portion regions of the aluminum foil whose surface was roughened so that end portion regions thereof were overlapped by 0.5 mm. Next, the end portion regions overlapped with each other were bonded and electrically connected using a "40 kHz-Ultrasonic Welding Machine" manufactured by Branson Ultrasonics Division of Emerson Japan Limited, thereby forming a connected body of the aluminum foils whose surfaces were not roughened and the aluminum foil whose surface was roughened.

Thus, an electrode body for a solid electrolytic capacitor component in which the four aluminum foils whose surfaces were not roughened were bonded to the aluminum foil whose surface was roughened was fabricated.

Among the four aluminum foils whose surfaces were not roughened formed at the four end portion regions of the aluminum foil whose surface was roughened in the thus fabricated electrode body, only parts other than the connected portions of the three aluminum foils which were formed on the three end portion regions of the aluminum foils whose surface was roughened was coated with resist.

Further, the thus fabricated electrode body was set in an aqueous solution of ammonium adipate prepared to have a concentration of 3% by weight, pH 6.0 so that the whole aluminum foil which was formed with an aluminum oxide film on the surface thereof and whose surface was roughened was completely immersed therein. At this time, among the four aluminum foils whose surfaces were not roughened, the three aluminum foils coated with resist were immersed in the aqueous solution of ammonium adipate and a part of the aluminum foil which was not coated with resist, namely, a portion thereof superposed on the aluminum foil whose surface was roughened, and welded thereon were immersed in the aqueous solution of ammonium adipate.

An aluminum oxide film was then formed by connecting the aluminum foil which was not coated with resist and whose surface was not roughened to an anode, oxidizing the cut side surfaces of the aluminum foils immersed in the aqueous solution of ammonium adipate under the condition that a forming current density was set at 50 to 100 $mA/cm^2$ and a forming voltage was set equal to or lower than 12 volts.

Thereafter, the electrode body was extracted from the aqueous solution of ammonium adipate and a solid high molecular polymer electrolyte layer containing polypyrrol was formed by chemical oxidization polymerization on the surface of the aluminum foil of the anodic electrode which was roughened.

More specifically, the electrode body was set in a cell of a mixing solution of ethanol and water containing 0.1 mol/liter of pyrrol monomer purified by distillation, 0.1 mol/liter of alkylnaphthalene sodium sulfonate and 0.05 mol/liter of ferrous sulphate (III) so that only the aluminum foil whose surface was roughened and which is formed of the aluminum oxide film was immersed therein and the solution was agitated for thirty minutes, thereby performing chemical oxidization polymerization. The same operation was repeated three times, thereby forming a solid high molecular polymer electrolyte layer containing polypyrrol. As a result, a solid high molecular polymer electrolyte layer having a thickness of about 50 μm was formed.

Carbon paste was coated on the surface of the thus obtained solid high molecular polymer electrolyte layer and silver paste was further coated on the carbon paste, thereby forming a cathode electrode. After the paste layers were formed, the resist layer was dissolved with an organic solvent, thereby removing the resist layer and the three aluminum foils whose surfaces were not roughened were exposed. Thus, a solid electrolytic capacitor component was fabricated.

Further, a total of three solid electrolytic capacitor components were prepared by repeating the above steps.

As shown in FIG. 16, the three solid electrolytic capacitor components were layered in such a manner that corresponding portions thereof were directed in the same directions and were integrated with each other by adhering the paste layers thereof using a conductive adhesive agent.

Thus, a multi-layered body of the solid electrolytic capacitor components in which the three solid electrolytic capacitor components were integrated with each other was fabricated.

The thus fabricated multi-layered body of the solid electrolytic capacitor components was mounted on a lead frame processed so as to have a predetermined shape as shown in FIG. 5. A portion of the conductive layer (paste layer) exposed from the lowermost surface of the multi-layered body was bonded onto the lead frame using a silver system conductive adhesive agent. One end portion region of each of the aluminum foils whose surfaces were not roughened was welded using a "YAG Laser Spot Welding Machine" manufactured by NEC Corporation and integrated with an anode lead portion of the lead frame.

After the multi-layered body of the solid electrolytic capacitor components was fixed onto the lead frame, it was molded with epoxy resin using an injection molding or a transfer molding.

The thus molded multi-layered body of the solid electrolytic capacitor components was removed from the lead frame and the anode lead electrodes were folded, thereby fabricating a discrete type and eight-terminal type solid electrolytic capacitor sample #2 shown in FIG. 15. Then, a predetermined voltage current was supplied to the solid electrolytic capacitor sample #2 by a well known method, thereby conducting aging and sufficiently lowering a leak electrical current. Thus, the solid electrolytic capacitor sample #2 was completed.

Electric characteristics of the thus fabricated solid electrolytic capacitor sample #2 were estimated in a similar manner to in Working Example 1.

As a result, the electrostatic capacitance of the solid electrolytic capacitor sample #1 at 120 Hz was 115.0 μF, the ESR value thereof at 100 kHz was 14 mΩ and the ESL value thereof at 100 kHz was 180 pH.

COMPARATIVE EXAMPLE 1

A copper foil was first cut from the sheet of a copper foil having a thickness of 60 μm so as to have a size of 0.5 cm×1 cm. Further, an aluminum foils was cut from the sheet of an aluminum foil having a thickness of 60 μm whose surface was not roughened so as to have a size of 1 cm×1 cm. They were superposed in such a manner that end portion regions thereof were overlapped by 0.5 mm and the superposed portions thereof were bonded and electrically connected using a "40 kHz-Ultrasonic Welding Machine" manufactured by Branson Ultrasonics Division of Emerson Japan Limited, thereby forming a connected body of the copper foil and the aluminum foil whose surface was not roughened.

Then, an aluminum foils was cut from the sheet of an aluminum foil having a thickness of 100 μm which was formed with an oaluminum oxide film and whose surface was roughened so as to have a size of 1 cm×1.5 cm and superposed on the aluminum foil whose surface was not roughened so that end portion regions thereof were overlapped by 1 mm and the superposed portions thereof were bonded and electrically connected using the ultrasonic welding machine, thereby forming a connected body of the copper foil, the aluminum foil whose surface was not roughened and the aluminum foil which was formed with an aluminum oxide film on the surface thereof and whose surface was roughened.

Thus, an electrode body for a two terminal-type solid electrolytic capacitor component including the copper foil, the aluminum foil whose surface was not roughened and the aluminum foil which was formed with an aluminum oxide film and whose surface was roughened in this order was fabricated.

Figure 27:
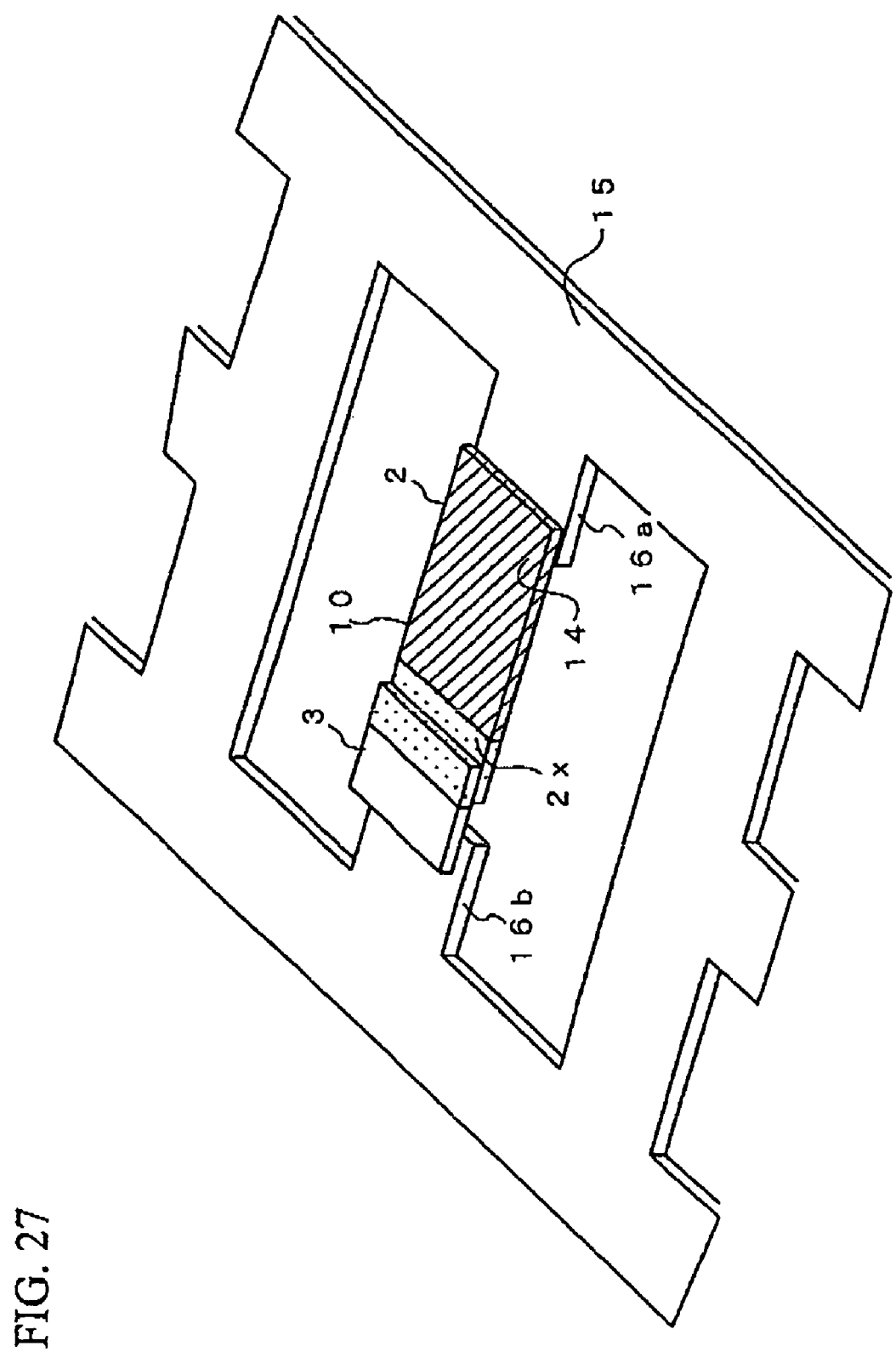
FIG. 27 is a schematic perspective view showing a two-terminal type electrolytic capacitor mounted on a lead frame, which is a comparative example.
Figure 28:
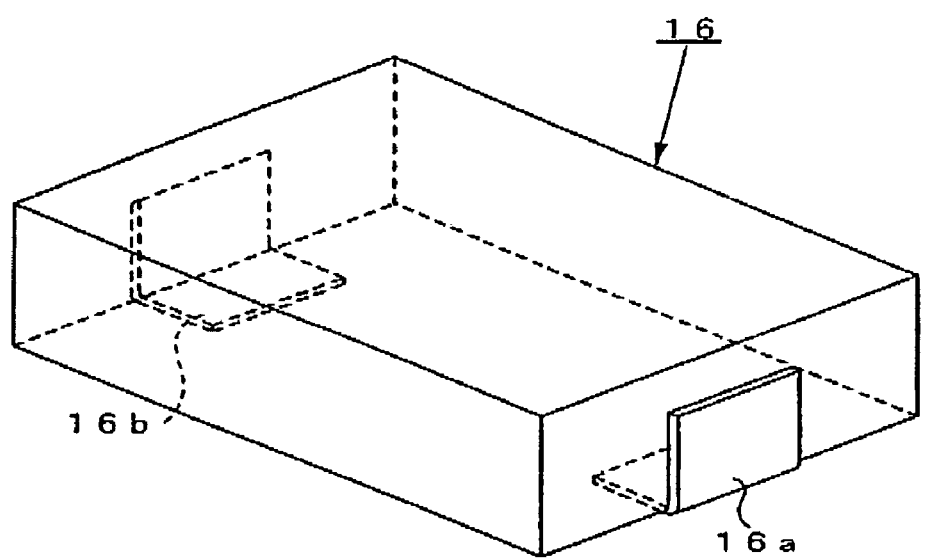
FIG. 28 is a schematic perspective view showing a discrete-type and two-terminal type electrolytic capacitor mounted on a lead frame, which is a comparative example.

The thus fabricated electrode body for a two-terminal type solid electrolytic capacitor component was processed in a substantially similarly manner to that in Working Example 1 and mounted on a lead frame shown in FIG. 27, thereby fabricating a discrete type and two-terminal type solid electrolytic capacitor sample #3.

Electrical characteristics of the thus fabricated three-terminal type solid electrolytic capacitor sample #3 were estimated in a similar manner to in Working Example 1.

As a result, the electrostatic capacitance of the solid electrolytic capacitor sample #3 at 120 Hz was 150 µF, the ESR value thereof at 100 kHz was 45 mΩ and the ESL value thereof at 100 kHz was 1500 pH.

From Working Examples 1 and 2 and Comparative Example 1, it was found that each of the solid electrolytic capacitor samples #1 and #2 fabricated by bonding the aluminum foil which was formed with an aluminum oxide film on the surface thereof and whose surface was roughened, the aluminum foil whose surface was not roughened and the copper foil had good electrostatic capacitance, ESR characteristic and ESL characteristic irrespective of how the foils were bonded, the material of electrical conductors and the kind of the solid high molecular polymer and that that in the solid electrolytic capacitor sample #3 according to Comparative Example 1, the ESR characteristic and ESL characteristic were poor and in particular, the ESL characteristic was extremely poor.

WORKING EXAMPLE 3

A solid electrolytic capacitor including a solid high molecular polymer electrolyte layer was fabricated in the following manner.

A rectangular aluminum foil was first cut from the sheet of an aluminum foil having a thickness of 100 µm whose surface was roughened and which was formed with an aluminum oxide film on the surface thereof so as to have a size of 0.2 cm². Further, an aluminum foil was cut from the sheet of an aluminum foil having a thickness of 60 µm whose surface was not roughened so as to have a width equal to or smaller than a half of the width of the aluminum foil whose surface was roughened.

The aluminum foil whose surface was not roughened was superposed on the aluminum foil whose surface was roughened at a position close to the corner thereof so that end portion regions thereof were overlapped by 0.5 mm. Next, the end portion regions overlapped with each other were bonded and electrically connected using the ultrasonic welding machine, thereby forming a connected body of the aluminum foil whose surface was not roughened and the aluminum foil whose surface was roughened.

Thus, an electrode body for a solid electrolytic capacitor component in which the aluminum foil whose surface was not roughened was bonded to the aluminum foil whose surface was roughened was fabricated.

Then, the thus fabricated electrode body was set in an aqueous solution of ammonium adipate prepared to have a concentration of 3% by weight, pH 6.0 so that the whole aluminum foil which was formed with an aluminum oxide film on the surface thereof and whose surface was roughened was completely immersed therein. At this time, a part of the aluminum foil whose surface was not roughened was immersed in the aqueous solution of ammonium adipate.

An aluminum oxide film was then formed by connecting the aluminum foil which was not coated with resist and whose surface was not roughened to an anode, oxidizing the cut side surfaces of the aluminum foils immersed in the aqueous solution of ammonium adipate under the condition that a forming current density was set at 50 to 100 mA/cm² and a forming voltage was set equal to or lower than 12 volts.

Thereafter, the electrode body was extracted from the aqueous solution of ammonium adipate and a solid high molecular polymer electrolyte layer containing polypyrrol was formed by chemical oxidization polymerization on the surface of the aluminum foil of the anodic electrode which was roughened.

More specifically, the electrode body was set in a cell of a mixing solution of ethanol and water containing 0.1 mol/liter of pyrrol monomer purified by distillation, 0.1 mol/liter of alkylnaphthalene sodium sulfonate and 0.05 mol/liter of ferrous sulphate (III) so that only the aluminum foil whose surface was roughened and which is formed of the aluminum oxide film was immersed therein and the solution was agitated for thirty minutes, thereby performing chemical oxidization polymerization. The same operation was repeated three times, thereby forming a solid high molecular polymer electrolyte layer containing polypyrrol. As a result, a solid high molecular polymer electrolyte layer having a thickness of about 50 µm was formed.

Carbon paste was coated on the surface of the thus obtained solid high molecular polymer electrolyte layer and silver paste was further coated on the carbon paste, thereby forming a cathode electrode and fabricating a two-terminal-type solid electrolytic capacitor component was fabricated.

Further, a total of four solid electrolytic capacitor components were prepared by repeating the above steps.

Among these, the two solid electrolytic capacitor components were disposed to be offset from each other by 180 degrees, superposed on each other so that the paste layers (conductive layers) thereof were overlapped and integrated with each other by adhering the paste layers thereof using a silver-epoxy system conductive adhesive-agent.

In this manner, a total of two multi-layered bodies of the solid electrolytic capacitor components each formed by integrating the two solid electrolytic capacitor components were fabricated. Further, as shown in FIG. 10, the multi-layered bodies of the solid electrolytic capacitor components were superposed so that cathode electrodes thereof each including the paste layer faced each other and integrated with each other by adhering the cathode electrodes thereof using a silver system conductive adhesive agent. At this time, the anode electrodes thereof were not connected.

The thus fabricated solid electrolytic capacitor component unit was mounted on a lead frame processed so as to have a predetermined shape as shown in FIG. 7. The paste layer (conductive layer) was adhered onto the lead frame using a silver system conductive adhesive agent and each of the anode electrodes were welded using a "YAG Laser Spot Welding Machine" manufactured by NEC Corporation and integrated with the lead frame.

After the solid electrolytic capacitor component unit was fixed onto the lead frame, it was molded with epoxy resin using an injection molding or a transfer molding.

The thus molded solid electrolytic capacitor component unit was removed from the lead frame and the anode lead electrodes and the cathode electrodes were folded, thereby fabricating a discrete type solid electrolytic capacitor sample #4 shown in FIG. 25. Then, a predetermined voltage current was supplied to the solid electrolytic capacitor sample #2 by a well known method, thereby conducting aging and sufficiently lowering a leak electrical current. Thus, the solid electrolytic capacitor sample #4 was completed.

Electrostatic capacitance and the $S_{21}$ characteristic of the thus fabricated three-terminal type solid electrolytic capacitor sample #4 were measured using an "Impedance Analyzer 4194A" and a "Net Work Analyzer 8753D" manufactured by Agilent Technologies. Then, equivalent circuit simulation was performed based on the thus measured $S_{21}$ characteristic, thereby determining an ESR value and an ESL value.

It was found that the electrostatic capacitance of the solid electrolytic capacitor sample #4 at 120 Hz was 115.0 µF, the ESR value thereof at 100 kHz was 14 mΩ and the ESL value thereof at 100 kHz was 15 pH.

COMPARATIVE EXAMPLE 2

An aluminum foil was first cut from the sheet of an aluminum foil having a thickness of 100 µm whose surface was roughened and which was formed with an aluminum oxide film on the surface thereof so as to have a size of 7 mm×4 mm. Further, an aluminum foil was cut from the sheet of an aluminum foil having a thickness of 60 µm whose surface was not roughened so as to have a size of 2 mm×4 mm. They were superposed in such a manner that end portion regions thereof were overlapped by 0.5 mm and the superposed portions thereof were bonded and electrically connected using the ultrasonic welding machine, thereby forming a connected body of the aluminum foil whose surface was roughened and the aluminum foil whose surface was not roughened.

Thus, an electrode body for a two-terminal type solid electrolytic capacitor component in which the aluminum foil whose surface was not roughened and the aluminum foil which was formed with an aluminum oxide film and whose surface was roughened were bonded was fabricated.

The thus fabricated electrode body for a two-terminal type solid electrolytic capacitor component was processed in a substantially similarly manner to that in Comparative Example 1 and mounted on a lead frame shown in FIG. 27, thereby fabricating a discrete type and two-terminal type solid electrolytic capacitor sample #5.

Electrical characteristics of the thus fabricated three-terminal type solid electrolytic capacitor sample #5 were estimated in a similar manner to in Working Example 1.

As a result, the electrostatic capacitance of the solid electrolytic capacitor sample #4 at 120 Hz was 100 µF, the ESR value thereof at 100 kHz was 45 mΩ and the ESL value thereof at 100 kHz was 1500 pH.

From Working Example 3 and Comparative Example 2, it was found that the solid electrolytic capacitor sample # 4 fabricated by bonding the aluminum foil which was formed with an aluminum oxide film on the surface thereof and whose surface was roughened, the aluminum foil whose surface was not roughened and the copper foil had good electrostatic capacitance, ESR characteristic and ESL characteristic irrespective of how the foils were bonded, the material of electrical conductors and the kind of the solid high molecular polymer and that that in the solid electrolytic capacitor sample #5 according to Comparative Example 1, the ESR characteristic and ESL characteristic were poor and in particular, the ESL characteristic was extremely poor.

The present invention has thus been shown and described with reference to specific embodiments and Working Examples. However, it should be noted that the present invention is in no way limited to the details of the described arrangements but changes and modifications may be made without departing from the scope of the appended claims.

For example, although two lead electrode pairs are drawn out from each of the opposite end portion regions of the solid electrolyte capacitor component in the above described first preferred embodiment and one lead electrode pair is drawn out from each of the four end portion regions of the solid electrolyte capacitor component in the above described second preferred embodiment, it is not absolutely necessary to draw out the lead electrode pairs in this manner and it is sufficient to draw out at least one lead electrode pair from at least one end portion region of a solid electrolyte capacitor component. Since magnetic fields generated by electrical currents flowing the anode lead electrode and the cathode lead electrode disposed adjacent with each other can be canceled by constituting the lead electrode pairs in this manner, it is possible to reduce the ESL of a solid electrolyte capacitor.

Furthermore, in the above described embodiment, although the anode lead electrode and the cathode lead electrode constituting a lead electrode pair are disposed at positions symmetric with respect to each other around the center of gravity of the foil-like aluminum substrate 2 whose surface is roughened, two lead electrode pairs to be provided at the opposite end portion regions of the foil-like aluminum substrate 2 whose surface is roughened may be disposed at positions laterally symmetrical with respect to the center line of the foil-like aluminum substrate 2 as the axis. Specifically, in the case where one lead electrode pair is to be provided at each of the opposite end portion regions of the foil-like aluminum substrate 2 whose surface is roughened, an anode lead electrode of one of the lead electrode pair may be disposed at a position facing an anode lead electrode of the other lead electrode pair.

Further, in the above described embodiments, although the aluminum substrate is used as the valve metal substrate 2, 3, the valve metal substrate 2, 3 may be formed of aluminum alloy, or tantalum, titanium, niobium, zirconium or alloy thereof instead of aluminum.

Moreover, in the above described embodiments, although phosphor bronze is used as a metal conductor for constituting a lead electrode, the metal conductor may be formed of other copper alloy, or brass, nickel, zinc, chromium or alloy thereof instead of phosphor bronze.

Further, in the above described embodiments, the foil-like aluminum substrate 2 whose surface is roughened and the foil-like aluminum substrate 3 whose surface is not roughened are connected by ultrasonic welding and the foil-like aluminum substrate 3 whose surface is not roughened and the anode lead electrode 16 of the lead frame 15 are connected by ultrasonic welding. However, both connected portions or one of them may be formed by cold welding instead of ultrasonic welding.

Furthermore, in the above described embodiments, although the surface of the foil-like aluminum substrate 2 is roughened so as to increase the specific surface thereof, it is not absolutely necessary in the present invention for the surface of the foil-like aluminum substrate 2 to be roughened.

Moreover, in the above described embodiments, although the foil-like aluminum substrate 3a, 3b whose surface is not roughened is bonded to the foil-like aluminum substrate 2 whose surface is roughened, it is not absolutely necessary in the present invention for the aluminum substrates to be foil-like and each of the aluminum substrates may be a frame-like or block-like substrate having a larger thickness, for example. Further, it is not absolutely necessary for the copper substrates to be foil-like and each of the copper substrates may be frame-like or block-like.

As described above, according to the present invention, it is possible to provide a solid electrolytic capacitor and a method for manufacturing a solid electrolytic capacitor which is constituted by sequentially forming an insulating oxide film, a solid high molecular polymer electrolyte layer and a conductive layer on a foil-like valve metal substrate whose surface is roughened and which is formed with an insulating oxide film on the surface thereof and can reduce the ESL and the ESR and increase electrostatic capacitance.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A solid electrolytic capacitor comprising:
   at least one solid electrolytic capacitor component comprising a foil-like valve metal substrate formed with an insulating oxide film on the surface thereof;
   at least one lead electrode pair including an anode lead electrode and a cathode lead electrode which are provided on at least one end portion region of the foil-like valve metal substrate;
   and a cathode electrode formed by sequentially forming at least a solid high molecular polymer electrolyte layer and a conductive layer on the foil-like valve metal substrate;
   the anode lead electrode comprising a valve metal body whose one end portion region is bonded to the at least one end portion region of the foil-like valve metal substrate so that electrical connection can be established between the valve metals and a first conductive metal substrate whose one end portion region is bonded to the other end portion region of the foil-like valve metal substrate so that electrical connection can be established between the metals;
   the cathode lead electrode being formed by drawing out a part of a second conductive metal substrate connected to one surface of the conductive layer formed on the foil-like valve metal substrate in a direction parallel to the anode lead electrode.

2. A solid electrolytic capacitor in accordance with claim 1 wherein at least one lead electrode pair is provided at each of opposite end portion regions of the foil-like valve metal substrate.

3. A solid electrolytic capacitor in accordance with claim 1 wherein at least one lead electrode pair is provided at each of four end portion regions of the foil-like valve metal substrate.

4. A solid electrolytic capacitor in accordance with claim 1 wherein a plurality lead electrode pairs are provided so that the anode lead electrodes and the cathode lead electrodes thereof are alternately disposed.

5. A solid electrolytic capacitor in accordance with claim 1 wherein a plurality of lead electrode pairs are disposed at positions symmetric with respect to each other around a center of gravity of the solid electrolyte capacitor.

6. A solid electrolytic capacitor in accordance with claim 1 wherein two or more solid electrolyte capacitor components are layered so that the anode lead electrodes and the cathode lead electrodes are directed in the same direction.

7. A method for manufacturing a solid electrolytic capacitor comprising steps of:
   bonding one end portion region of a valve metal body to at least one end portion region of a foil-like valve metal substrate formed with an isolating oxide film, thereby fabricating an electrode body for a solid electrolyte capacitor component;
   masking the electrode body so that a part of the valve metal body cannot be subjected to anodic oxidization;
   dipping the electrode body in a forming solution so that the whole of the foil-like valve metal substrate, the whole portion subjected to masking processing and a part of the valve metal body which has not been subjected to the masking processing are immersed therein, applying voltage to the electrode body to effect anodic oxidization thereon and form an insulating oxide film at least at an edge portion of the foil-like valve metal substrate;
   forming a solid high molecular polymer electrolyte layer on the substantially entire surface of the foil-like valve metal substrate;
   coating the solid high molecular polymer electrolyte layer with a conductive paste and drying the conductive paste to form a conductive layer, removing the mask from the valve metal body;
   mounting at least one solid electrolytic capacitor component thus fabricated on a lead frame, bonding one end portion region of an anode lead portion of the lead frame to the other end portion region of a valve metal body whose surface is not roughened, thereby forming an anode lead electrode, and connecting a cathode lead portion of the lead frame to the conductive layer, thereby forming a cathode lead electrode so as to be drawn out from the conductive layer in a direction parallel to the anode lead electrode.

* * * * *